(12) United States Patent  
LaPant

(10) Patent No.: US 6,405,744 B1
(45) Date of Patent: Jun. 18, 2002

(54) AUXILIARY FUEL TANK SYSTEM WITH ON-BOARD DIAGNOSTICS

(76) Inventor: Todd LaPant, 1860 Inghram Rd., Kirkwood, CA (US) 96021

( * ) Notice: Subject to any disclaimer, the term of this patent is extended or adjusted under 35 U.S.C. 154(b) by 0 days.

(21) Appl. No.: 09/769,116

(22) Filed: Jan. 23, 2001

(51) Int. Cl.[7] .................................................. G05D 7/06
(52) U.S. Cl. ....................... 137/1; 137/255; 137/624.11
(58) Field of Search ........................... 137/255, 624.11, 137/1

(56) References Cited

U.S. PATENT DOCUMENTS 4,591,115 A * 5/1986 DeCarlo ................. 137/255 X
5,426,971 A * 6/1995 Glidewell et al. ......... 73/19.05
5,555,873 A * 9/1996 Nolen ..................... 137/255 X

* cited by examiner

Primary Examiner—Kevin Lee
(74) Attorney, Agent, or Firm—Ronald L. Rohde

(57) ABSTRACT

A computer controlled auxiliary fuel tank system provides one or more additional fuel sources as either original equipment with new vehicles, or as an aftermarket addition to an older vehicle. The auxiliary system monitors and controls the on-board testing of each main fuel system, and their associated fuel displays, whether or not the vehicle includes a main fuel computer system. On-board testing is compliant with California Air Resources Board, On Board Diagnostics II, and with the Environmental Protection Agency On Board Diagnostics II) requirements. The auxiliary fuel system comprises an auxiliary fuel tank, having an auxiliary fuel pump, a sending unit, check valves, inlet and outlet fuel lines, a wiring harness, a computer module, an auxiliary emissions canister assembly, vehicle installation means, and LCD and LED display devices. Fuel levels in each tank are read, compared and balanced once every 4 seconds. Prior to each readings, the tank's senders are pulse-preconditioned so as to reduce the errors associated with fuel additive corrosion. In addition to the display of the gallons of fuel in each system, the vehicle's gas gauges are rescaled so as to indicate the percentage of total fuel on-board. In addition to warning of fuel quantity problems, the operator is made aware of the potential causes of such problems by being provided with a series of diagnostic trouble codes resulting from testing.

52 Claims, 15 Drawing Sheets

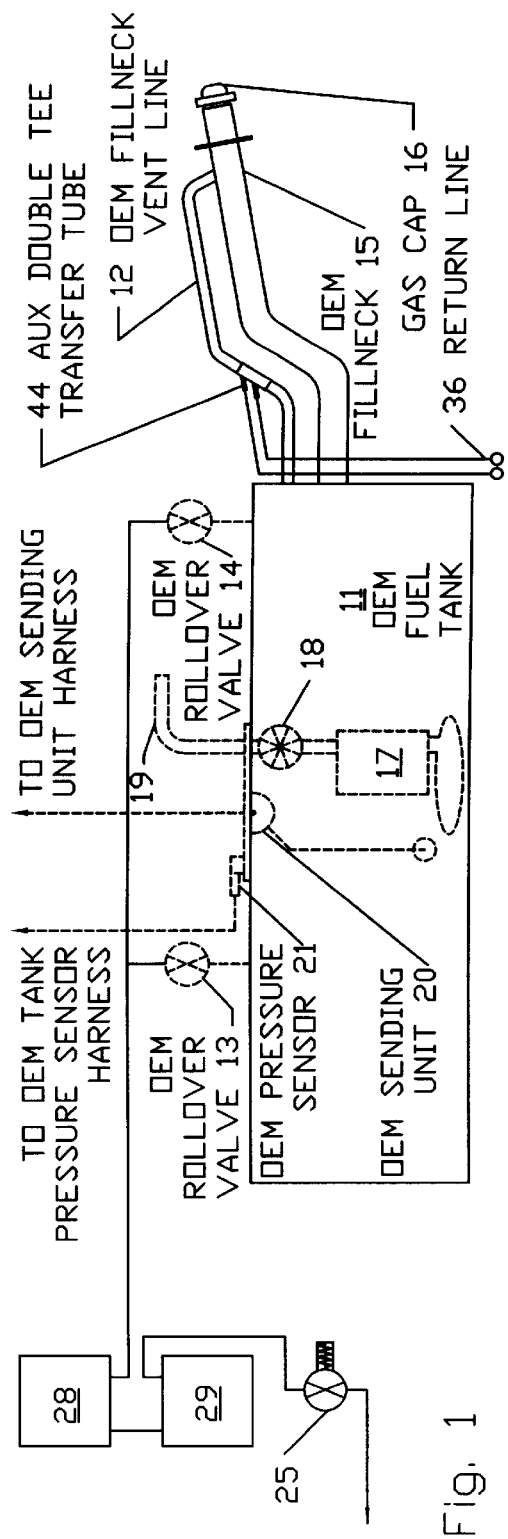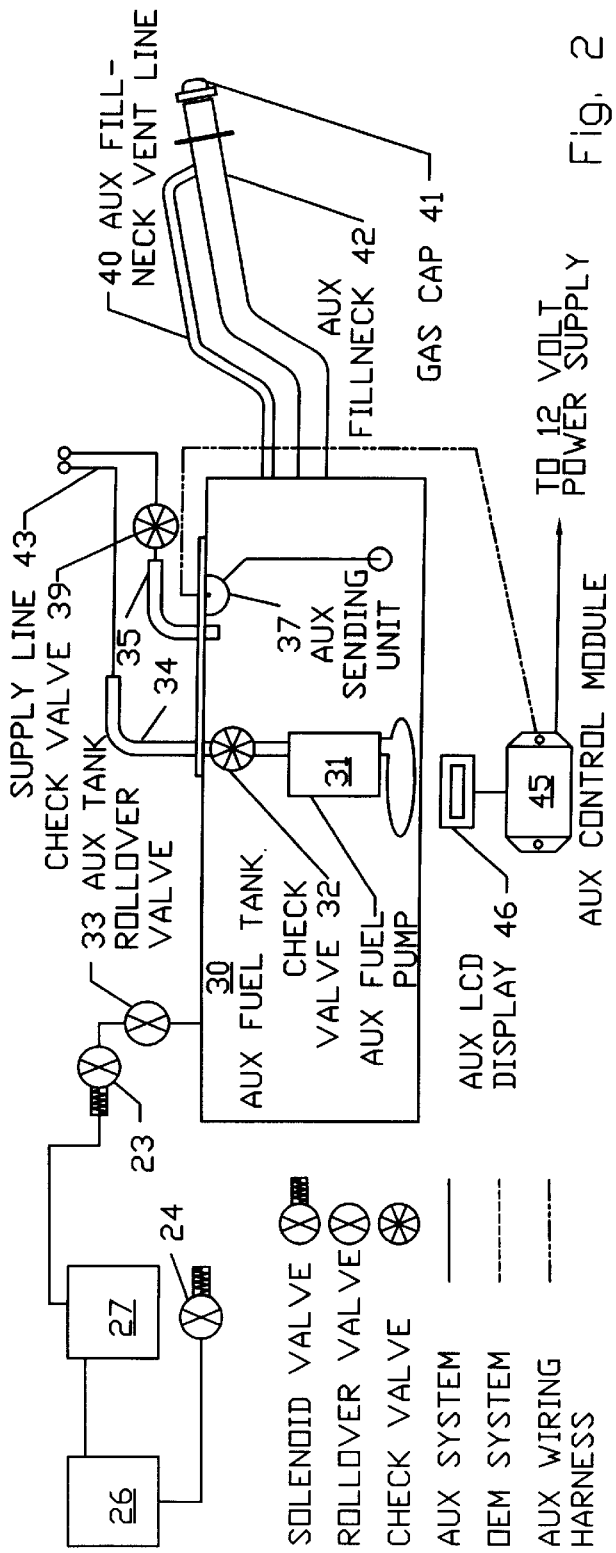

AUXILIARY FUEL TANK SYSTEM WITH ON-BOARD DIAGNOSTICS

BACKGROUND OF THE INVENTION

1. Field of the Invention

This invention relates generally to computer controlled vehicle subsystems, and especially to auxiliary fuel tank control equipments which are adaptable to many classes of vehicles, and which include on-board diagnostic (OBD) capabilities. The system is designed to work with both new and used main fuel systems, and can provide OBD capability to either system.

Computer controlled vehicle subsystems have long been used on vehicles to control various vehicle subsystems such as engine, ignition, transmission, brake, and suspension systems. Due to the complexity and inter-relationship between some of these vehicle systems, buses, or other on-board computer communication systems, have been developed to enable data and control signals to be passed between particular vehicle computers. Because of the heavy reliance on such on-board computers, combined with the variety of system types employed by the various automobile manufacturers, vehicles sold in the United States now are required to provide a standardized diagnostic interface to facilitate compatibility with standardized diagnostic scan tools. In California, this restriction is referred to as the CARB OBD (California Air Resources Board On Board Diagnostics 11, or EPA OBDII (Environmental Protection Agency On Board Diagnostics II) requirements, and have been applied to new vehicles beginning with the 1996 model year and to all vehicles in the 1998 model year. This applies to vehicles under 14000 lbs. GVWR in California and under 8600 lbs. GVWR outside California.

2. Background Art

Fuel transfer systems are, in general, well known. Sasaki, et al, in U.S. Pat. No. 4,834,132 for a Fuel Transfer Apparatus, describes a fuel transfer system for transferring fuel from a first sump to a second sump formed in a fuel tank used in an automotive vehicle.

U.S. Pat. No. 4,951,699 to Lipman for a Fuel Transfer System with Aspirator, shows a device and system to transport fuel from the interior portion of a fuel tank to another tank by automatic siphon action. An aspirator that evacuates air and fuel vapor from the siphon by the flow effect of the return fuel through a venturi or reduced diameter portion of the return fuel line initiates the siphon.

It is generally well known to provide special apparatus for verifying the operation of a data processing system. Some systems include separate maintenance or auxiliary processing units for testing different subsystems during normal operation or during a test mode of operation. It is also well known to include an internal testing capability integrated within the processing units of a system for establishing a certain level of operability. An example is seen in U.S. Pat. No. 5,548,713, in which Petry et al describe an on-board diagnostic testing apparatus which can test a processing unit in a system, and which also is usable in a factory test environment.

Communications of diagnostic test results are also known. Berra et al, in U.S. Pat. No. 5,555,498 describes a circuit and method for interfacing vehicle controller and diagnostic test instruments. An adapter is provided which permits the use of present diagnostic tools with newer ISO9141 equipped engine and transmission controllers. The adapter facilitates bidirectional communication while conditioning the signals entering and exiting the adapter.

Machida et al, in U.S. Pat. No. 5,592,923, describe diagnosis apparatus for treating fuel vapor of an engine, in which the fuel vapor in a fuel tank is once adsorbed and trapped in a canister and is then supplied to the intake system of an engine, wherein various valves are so controlled that a predetermined pressure condition is established in a passage for supplying the fuel vapor, and said various valves are diagnosed to determine whether they are defective or not, based upon pressure measurements against a norm.

Fundamental difficulties in obtaining low cost, accurate, and repeatable fuel level measurement systems have been recognized. A float-level sensor, including an immersed resistive sender element, has become a common standard, but it is known to be subject to effects of contact corrosion associated with various additives in the fuel. Gonze, in U.S. Pat. No. 4,782,699, combats alcohol caused corrosion by applying a 1-millisecond current pulse to the detector once a minute. In U.S. Pat. No. 5,172,007, Lumetta describes the problems associated with these common senders when immersed in so-called "flexible fuels" being developed for reduced hydrocarbon emissions. His specific solutions have been shown to be effective with M-85 (85% methyl alcohol and 15% gasoline) fuel when switched between 100 Hz and 15 kHz, but nothing is taught regarding more common gasoline fuels incorporating modern additives.

SUMMARY OF THE INVENTION

This system is designed to provide one or more auxiliary fuel sources as original equipment with new vehicles, or as an aftermarket addition to an older vehicle. The auxiliary system controls and monitors each fuel system and their associated fuel display. Fuel levels in each tank are balanced, diagnostic data is obtained from the performance of each system, and corrective actions including operator warnings are given. Although the original equipments may have their own computer controlled diagnostic capabilities, the auxiliary computer runs standard tests on all fuel systems. Each system's fuel tank senders are pulse-preconditioned prior to reading in a similar manner, with a technique unique to this invention.

The auxiliary fuel system of this invention comprises an auxiliary fuel tank, having an auxiliary fuel pump, a sending unit, check valves, inlet and outlet fuel lines, a wiring harness, a computer module, an auxiliary emissions canister assembly, vehicle installation means, and a liquid crystal display (LCD) device. In a typical installation in a pickup truck, the main original equipment manufacturer (OEM) fuel tank is sized around 30 gallons. The Auxiliary Fuel Tank is typically a 30-gallon tank that is mounted at the head of the pickup box. The computer module is mounted under the dash near the steering column. The Auxiliary emissions canister assembly is mounted near the OEM emissions canister assembly. The pump/sender is mounted in the Auxiliary tank. The wire harness routes from the computer module to the Auxiliary pump/sender, to the Auxiliary pressure sensor, to the OEM pump/sender, to the OEM pressure sensor, to the OEM fresh air vent solenoid valve, to the Auxiliary tank solenoid valve, to the OEM tank solenoid valve, to 12-volt power, and to chassis and OEM computer ground. The system functions as a computer controlled balance line. The computer monitors the entire system approximately once every four seconds. During each loop the fuel levels of the OEM and the Auxiliary tanks are determined. The Liquid Crystal Display (LCD) will indicate the gallons in the OEM tank, the gallons in the Auxiliary tank, the total gallons in the system, and the status of the system. The computer will also adjust the OEM fuel gauge accordingly.

It will be noted that the capacity ratio of a typical single Auxiliary tank to a single OEM tank is 1:1. During the transfer process, when the OEM tank is two gallons less than the gallons in the Auxiliary tank, the Auxiliary fuel pump will turn on and transfer fuel to the OEM tank. The transfer ends when the OEM tank is equal to the gallons in the Auxiliary tank. When the Auxiliary pump is on, the LCD will display "PMP ON".

The Auxiliary fuel system of this invention also includes an On-Board-Diagnostics (OBD) capability. This system detects multiple problems that occur upon installation and during normal use. When a problem occurs for a set period of time, say at least 30 seconds, the computer will detect the problem and display the Diagnostic Trouble Code (DTC) associated with that problem on the LCD. A red light-emitting diode, (LED) will also be blinked a specific number of times for operator warning. After the problem has been displayed, and if it is the first problem that has occurred during that driving cycle, the computer will store that problem in its memory. The computer will then send the fuel gauge to empty and set the Auxiliary and Main tank gallon's readings to zero. This will let the driver know that there is a problem. This system addresses five (5) different basic problems. These problems, with their visual display indications, are as follows:

1) Main Sender Grounded. (MSG), 1 LED Display Blink.

The Main Sender Ground DTC is set when the resistance from the main sender drops below a predetermined set point, approaching ground. A malfunctioning sending unit or a wire rubbing against ground could cause this condition.

2) Main Sender Open (MSO) 2 LED Display Blinks.

The Main Sender Open DTC is set when the main sender resistance raises above a predetermined set point, i.e. toward an open circuit condition. This condition could be caused by wire corrosion or by a broken wire.

3) Auxiliary Sender Ground (ASG), 3 LED Display Blinks.

This DTC is set in a manner similar to the MSG, but can have different predetermined set points.

4) Auxiliary Sender Open (ASO), 4 LED Display Blinks.

This DTC is set in a manner similar to the MSO, but can also have different predetermined set points.

5). No flow problem (NO FLW), 5 LED Display Blinks.

The No Flow Problem is set if the auxiliary pump is turned ON, and if the fuel level in the Auxiliary tank has not dropped by a predetermined amount. This condition may indicate a crimped line, a malfunctioning pump, or a broken wiring connection.

This Auxiliary fuel system is compatible with OBDII enhanced evaporative emissions testing, which is required on all new 1998 fuel-injected gas vehicles under 14,000 GVW in California and under 8600 lbs. outside California. The Auxiliary fuel system is transparent to the OEM computer, in that the OEM computer is not aware that an Auxiliary fuel system has been added.

It is a principal object of this invention to provide a computer controlled auxiliary fuel system, which is compliant with the CARB OBD (California Air Resources Board, On Board Diagnostics II) and with the EPA OBDII, (Environmental Protection Agency On Board Diagnostics II) requirements.

It is an additional object of this invention to provide a computer controlled auxiliary fuel system, which is compatible with a vehicle's existing main fuel system.

It is another object of this invention to provide a computer controlled auxiliary fuel system, which is transparent to the main fuel system's computer.

It is a further object of this invention to provide a computer controlled auxiliary fuel system, which includes self-diagnostic capabilities.

It is another object of this invention to provide a computer controlled auxiliary fuel system that is useable in both original, and after-market equipments.

It is yet another object of this invention to provide a means of measuring a standard fuel level sender with repeated accuracy by use of a computer controlled pulsing system.

Further objects of this invention include the provision of a reliable computer controlled auxiliary fuel system which may be inexpensively manufactured, is structurally rigid and safe, and can be easily installed in both current and older model vehicles.

The above and other objects, features, and advantages of the present invention will become more apparent from the following description, when making reference to the detailed description and to the accompanying sheets of drawings.

BRIEF DESCRIPTION OF THE DRAWINGS

FIG. 1 presents a mechanical diagrammatic representation of an existing OEM fuel system.

FIG. 2 shows a mechanical diagrammatic representation of the auxiliary fuel system added to a vehicle in accordance with this invention.

DETAILED DESCRIPTION OF THE PREFERRED EMBODIMENTS

Figure 3:
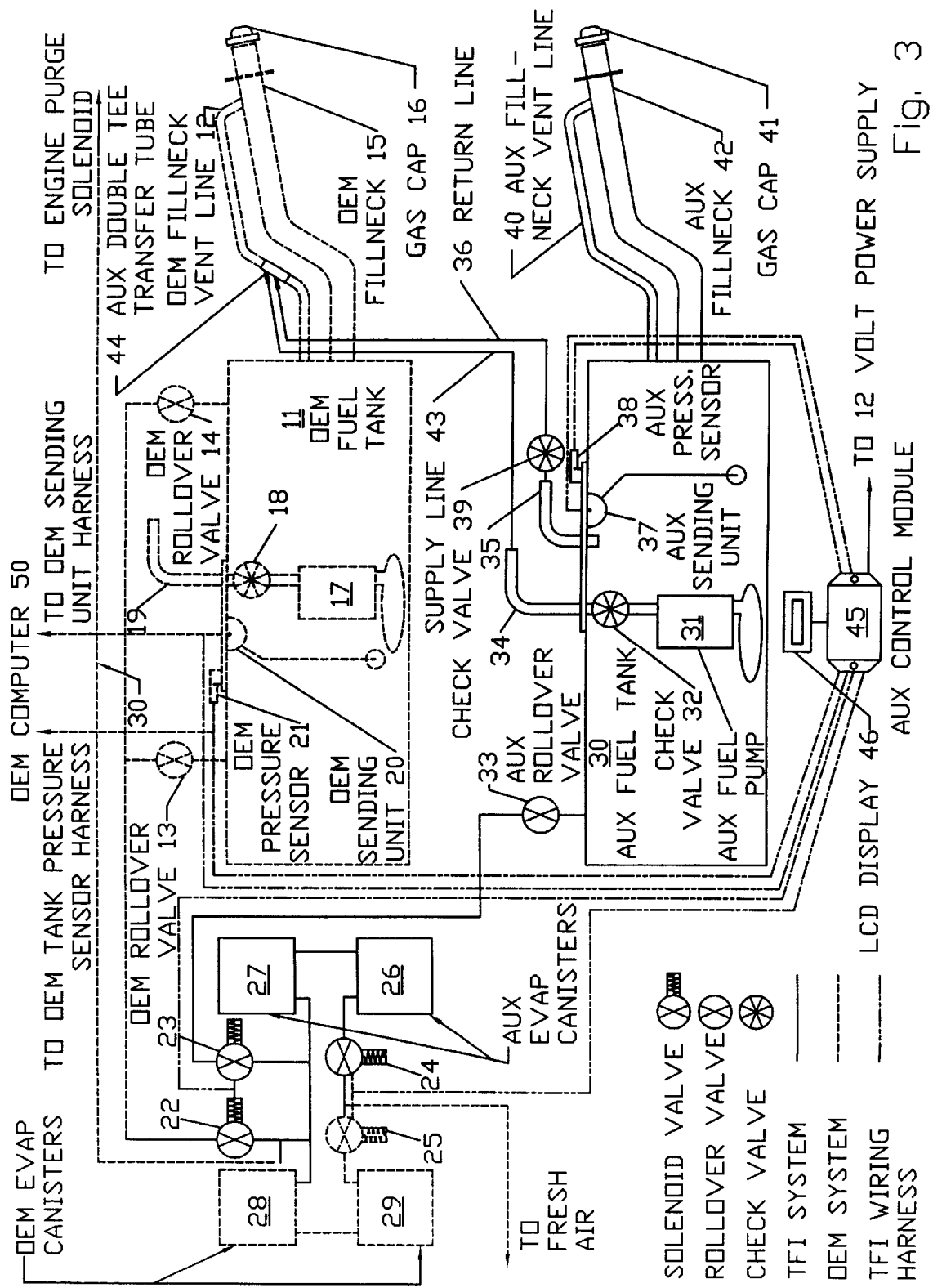
FIG. 3 depicts a more detailed schematic representation of the fuel systems of FIG. 1 and FIG. 2 interconnected with computer control and display means in accordance with this invention.

FIG. 1 shows a mechanical diagrammatic representation of a prior art OEM fuel system 10, comprising a main fuel tank means 11 having means 17 for pumping the fuel from the tank, means for determination of the fuel level therein, having and sender means for sending fuel level signals to exterior measurement and control devices; and means for filling the fuel tank having fill neck means 15 including a gas cap 16, and a vent line 12 between tank 11 and fill neck 15. Fuel vapor emissions produced inside fuel tank 11 exit therefrom, and are passed through rollover valves 13 and 14 to emissions control means comprising canisters 28 and 29, wherein they are temporarily adsorbed and trapped. An air passage is connected to an electromagnetic air vent valve 25 that can selectively shut off fresh air passage into canister 29. A purge passage also extends between canister 28 and the vehicle intake system in order to supply fuel vapors to an engine purge valve. (Not shown)

FIG. 2 shows a mechanical diagrammatic representation of the new auxiliary fuel system integrated with an existing fuel system in accordance with this invention. The system comprises an auxiliary fuel tank means 30, auxiliary fuel pump means 31, means for determination of the auxiliary fuel level therein, auxiliary sender means 37 for sending fuel level signals to exterior measurement and control devices, an auxiliary fill neck 42, a gas cap 41, and a vent line 40 between tank 30 and fill neck 42. Fuel is delivered from the auxiliary fuel tank means 30 by auxiliary fuel pump means 31 through check valve 32 into the pump sending unit supply tube 34. Supply tube 34 is connected to supply line 43, and enters OEM vent line 12 via one-half of a double tee transfer tube 44. Return line 36 is connected through check valve 39 to pump sending unit return tube 35. Disposed within auxiliary tank 30 are the auxiliary fuel pump means 31 connected to the internal end of the supply tube 34 through check valve 32. Also attached to auxiliary tank 30 is pressure sensor 38. Fuel vapor emissions produced inside auxiliary fuel tank 30 exit therefrom, and are passed through rollover valve 33 to emissions control means comprising canister assemblies 27 or 28 via normally open electromagnetic vent valve means 23. First emissions canister assembly 27 connects with a second emissions canister assembly 26. The fresh air passage is connected to electromagnetic air vent valves 24 and 25, which can selectively shut off fresh air passage into second emissions canisters 26, and 29 respectively.

FIG. 3 illustrates a more detailed schematic representation of the fuel systems of FIG. 1 and FIG. 2 interconnected with computer control and display means in accordance with this invention. The OEM system elements are shown in phantom, and the OEM fuel pump 17, and the OEM pressure sensor 21, and its associated OEM sending unit 20, have been added. FIG. 3 also depicts an OEM computer 50 and an Auxiliary system computer control module 45. Computer 45 can store 64 different DTCs in its data memory. Based on vendor data, the program and data in the memory can be rewritten approximately 10,000 times and is expected to have a 50-year storage life. The computer control module 45 also is associated with an Auxiliary display unit 40, having a liquid crystal display (LCD) 46.

In operation, when Auxiliary tank 30 is to be tested for leaks, pressure sensor 38 in the Auxiliary tank will be connected to OEM computer 50, and the main tank solenoid valve 22 will be closed. This operation will isolate main tank 11, allowing the OEM computer 50 to test only the Auxiliary tank 30 and both of the emissions canister assemblies.

During the process of leak testing, OEM tank 11 is tested for three driving cycles in a row, then the Auxiliary Computer 45 will switch over and cause OEM computer 50 to test the Auxiliary tank 30 three driving cycles in a row. An Auxiliary test counter will only increment when a leak test has occurred for more than eight seconds, which represents the minimum time to complete a successful test. The system has been set to allow unlimited leak tests to occur during the same driving cycle on the same tank. The system will not allow the Auxiliary tank 30 to be tested when its level is below a predetermined level. In this case, the OEM tank will be tested but the Auxiliary test counter will not change.

FIG. 4 presents an overall flow chart depicting each significant step in the testing process, together with a brief description of the program subroutines associated with each step.

The Auxiliary Computer actually controls the original vehicle fuel gauge, so that the signal from the main tank-sending unit is connected directly to the gauge if the Auxiliary fuel system loses power. The auxiliary computer contains a relay, which diverts the signal from the OEM fuel tank sending unit to either the OEM fuel gauge or the main sender input. When the auxiliary computer does not have power, or during the first 10 seconds of operation, the OEM fuel gauge is connected to the main tank sender, as it was furnished in the original equipment configuration. This permits the gauge to indicate the actual level of fuel in the main tank. After the first 10 seconds, the auxiliary computer turns on the relay and the OEM gauge is now controlled by the Auxiliary computer, which also monitors the main signal sender.

When the vehicle is started, the auxiliary computer displays the serial number of the program in the LCD, and then a few seconds later it displays the serial number of the computer module program. Then it loads the OBDII tank and the OBDII test information from the computer's electrically erasable programmable read-only memory, (EEPROM). It then turns on the fuel gauge relay and measures the gallons in the auxiliary fuel tank. If the gallons in the auxiliary tank are less than a predetermined value, or the OBDII tank is set on main, the auxiliary computer connects the main pressure sensor signal to the OEM computer. Otherwise it connects the auxiliary pressure sensor to the OEM computer. Accordingly, our wiring is such that the signal from the OEM pressure transducer is rerouted through the Auxiliary Computer. Since the signal from the AUXILIARY pressure sensor is also routed through the Auxiliary Computer, the AUXILIARY computer has control over which signal is routed to the OEM computer.

The auxiliary computer then measures the gallons of fuel in the main and auxiliary fuel tanks. In order to accurately measure the fuel level in each of the fuel tanks, a preconditioning "pulse circuit" was developed. This pulse circuit is a major feature of this invention in that it adds the capability of reducing the greater corrosive effects expected with an older main fuel tank sender which has not had any prior corrective action. This circuit functions such that, immediately before the auxiliary computer measures the voltage at the fuel level sender, a relative high current pulse is sent to the fuel level sender to break through any corrosion or contamination that may have been caused by the fuel or fuel additives. This pulse lasts for approximately 200 ms, and then within 15 ms, the computer reads the voltage level of the fuel level sender to determine the fuel level. This pre-measurement pulse conditioning has been shown to increase the reliability and accuracy of all conventional fuel level senders using a variable resistance style sensor. After displaying the gallons in each tank, and the total gallons on the vehicle, the auxiliary computer adjusts the OEM fuel gauge accordingly. If it is not time to transfer fuel or no leak test is occurring or no problems were detected, the auxiliary computer continues to loop through this same sequence of events.

When the auxiliary computer determines that it is necessary to transfer fuel, it turns a fuel pump on in the auxiliary fuel tank. Fuel is transferred through the supply tube into the supply line, through the double tee transfer tube, into the vent tube on the OEM fill neck and into the OEM tank. When the Auxiliary fuel pump transfers fuel from the Auxiliary tank into the OEM tank, the system functions as an automatic balancing system. For example, if it senses that the fuel in the Auxiliary tank is approximately 2 gallons more than the fuel in the main tank for a period of time, the auxiliary fuel pump is turned ON. The computer will continue to check the fuel level until the fuel in the main tank is approximately equal to the level of fuel in the Auxiliary tank. If the auxiliary fuel pump is on, and the gallons in the auxiliary tank have not decreased by a set amount over a number of cycles, then the auxiliary computer stores a DTC condition of "NO FLOW". It then sends the OEM fuel gauge to empty and sets the gallons in the main and the auxiliary tanks to zero. The computer then causes the red diagnostic light on the auxiliary computer module to blink five (5) times, which continues until the vehicle is turned off and restarted.

The auxiliary computer monitors the OEM fresh air vent solenoid once during each loop cycle to determine if a leak test is occurring. If a leak test is occurring, the auxiliary computer turns off the fuel pump if it is on, and turns on either the main or auxiliary solenoid valve, depending on the OBDII tank value. If, for instance, the OBD tank value is set to auxiliary, and the main tank solenoid is ON, the main tank is sealed off from the system. If the leak test does not occur for more than 8 seconds, it automatically terminates and the computer continues looping through the program. If the leak test occurs for more than 8 seconds, a counter inside the auxiliary computer is incremented and the data is saved in its EEPROM. The first time the OEM computer runs a test, the counter would be at Main and 0. At the next test, the count would be at Main and 1, followed by an increment to Main and 2. When the auxiliary computer determines that it is at Main and 2, and that the test ran for longer than 8 seconds, it would switch over to the Auxiliary and 0. The system would then increment auxiliary and 1, followed by auxiliary and 2, then it would switch back to main and 0.

Assume that the OEM Computer initiates a leak test. The auxiliary computer monitors the signal through the fresh air vent solenoid valve, and if that solenoid valve is turned on, its state indicates that the OEM computer is running a leak test. When the OEM solenoid activates, the auxiliary fresh air vent solenoid does likewise, because they are wired together. Physically, the harness from the OEM solenoid is disconnected and "T"d so that the auxiliary system actually monitors the signal, and the same power is used to supply power to the auxiliary fresh air vent solenoid valve. This prevents fresh air from coming into either the OEM or the auxiliary emissions canister systems. In turn, when then OEM system generates a vacuum on the system, it evacuates both canister assemblies. Either the main or auxiliary fuel tank is selected, and nothing is done with the other fuel tank.

A major feature of our invention is that neither the OEM computer nor any calibrations inside the OEM computer are changed. The Auxiliary Computer determines that when the OEM computer conducts a leak test, the leak test will be on the OEM tank during a given driving cycle, and a few driving cycles later that the leak test will be on the AUXILIARY tank.

If the Auxiliary system has power, it will send a signal to the gauge as a function of the total capacity in both tanks. If a problem was detected for at least twenty consecutive cycles, then the Auxiliary Computer sets the fuel gauge, as a visual indicator to the driver, to "empty", the main and auxiliary tanks' gallons are set to zero, and the trouble code on the LCD is displayed. A small red LED is also blinked a given number of blinks, depending on the specific trouble code. If it blinks once every certain period of time, it means that the system has a main sender ground. If it blinks twice, it means that the system has a main sender open. If it blinks three times, it means that the system has an auxiliary sender ground. If it blinks four times, the system has an auxiliary sender open, and if it blinks five times, the system has a "NO FLOW" condition.

DETAILED DESCRIPTION OF THE AUXILIARY COMPUTER PROGRAM

Initialization Group

Figures 4A, 4B:
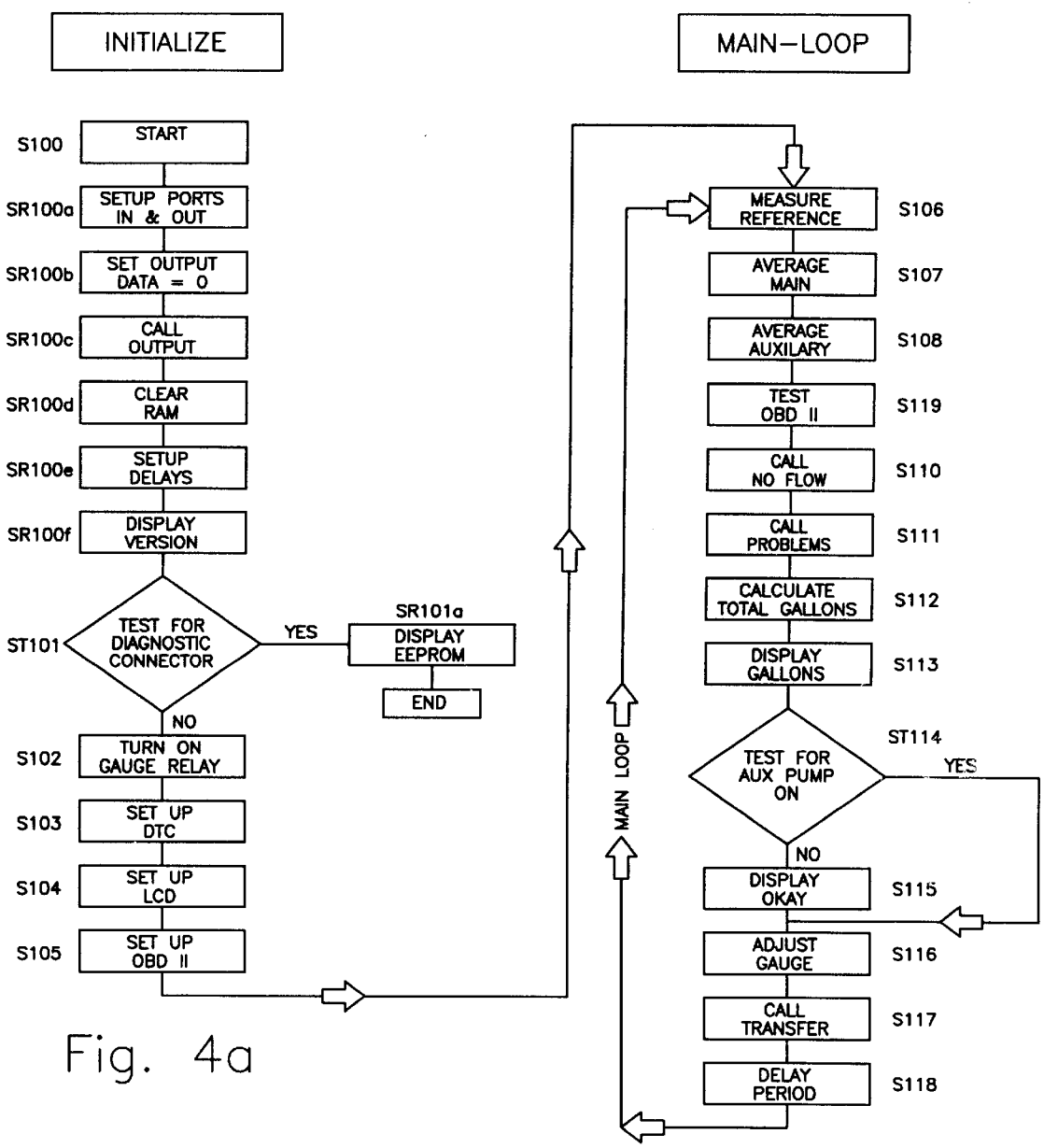
FIG. 4a presents a basic flow chart illustrating the sequencing of the Initialization portion of the computer program utilized in this invention.
FIG. 4b presents a basic flow chart illustrating the sequencing of the Main portion of the computer program utilized in this invention.

The system software programs that are stored in the EEPROM memory consist of three main groupings. Referring to FIG. 4a, the first group performs the INITIALIZE function, which sets up the variables and I/O ports. The second group, shown in FIG. 4b, is the MAIN LOOP, which directs the overall program flow. The computer loops through the main loop approximately once every four seconds. The final groupings, FIG. 5 through FIG. 13, comprise all of the routines and subroutines required to complete the detailed tasks requested by the other two groups. These independent subroutines are presented here in an arbitrary order, since their use is actually called upon as demanded by the other groupings. After the called routine is finished, control is returned to the previous group.

The INITIALIZE group starts at step S100, in FIG. 4a, by setting up the input output (I/O) ports and connection pins. It first sets the proper ports to inputs and outputs by calling the routine at SR100a, SETUP PORTS IN AND OUT, as detailed in FIG. 5a. Port settings are made in subroutines SR100a 1 and SR100a 2, while pin settings are made in SR100a 3 and ST100a 4. After the output data is cleared at SR100b, the SR100c OUTPUT routine is called, as detailed in FIG. 6a. In the output routine at SR100c the output data is put into a temporary variable, TEMP2 at S100a. Then the strobe pin is cleared to enable the serial to parallel converter at S100b. Then another temporary variable, TEMP1, is set to 8 at S100c. Then a test is made to see if TEMP2 bit 7 is high at ST100a. If TEMP2 bit 7 is high, then port B bit 7 is made high at S100d. If TEMP2 bit 7 is not high, then port B bit 7 is made low at S100e. Then the bits in TEMP2 are rotated to the left at S100f. Then the clock bit is set and then cleared to put the bit into the serial to parallel converter at S100g. Then TEMP1 is decreased by 1 at S100h and tested to see if it equals zero at ST100c. If TEMP1 is not equal to zero, the loop is repeated. After 8 times through the loop, the output data has been serially sent to the serial-to-parallel converter. When TEMP1 equals zero, then the strobe is set to disable any new information into the serial-to-parallel converter at S100i.

The next step, at SR100d, clears all the variables in the random access memory by looping through each ram address and clearing it. After all the variables have been cleared, the time delays required for use in other subroutines in the program are set at SR100e. When this is complete, the program version, date, and serial number are sent to the LCD by calling the DISPLAY VERSION subroutine at SR100f. This is done by serially sending information to the LCD at 2400 baud, 8 bits, no parity and 1 stop bit.

After the serial number has been displayed on the LCD, the initialize routine then performs the TEST FOR DIAGNOSTIC CONNECTOR at step ST101 to see if a diagnostic connector is connected. If a diagnostic connector is present, then the DISPLAY EEPROM subroutine, SR101a, is run. This subroutine reads the latest DTC data that was stored in memory, displays it in the LCD, and blinks the diagnostic light on the board appropriately. It then continues to read the other DTC's that were set in memory and displays them on the LCD until it reaches the end. Along with displaying the DTC, it also displays the address of the current DTC.

If a diagnostic connector is not present, the INITIALIZE group then proceeds to TURN ON GAUGE RELAY at step S102. Setting the OUTPUT data variable to "relay on" and calling the output routine does this. This relay is a normally closed circuit which connects the OEM fuel gauge wire to the OEM sending unit wire, thereby allowing the dashboard fuel gauge to show the level of the main fuel tank when the vehicle is first started, or when the computer does not have power. This is a safety feature that allows the operator to put the system back into the original condition when there is a concern about the operation of the auxiliary computer. It also allows the operator to know how much fuel is in the main tank each time the vehicle is started.

Figure 5A:
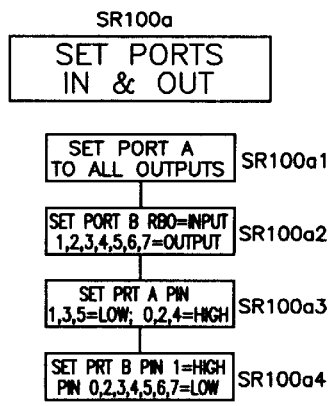
FIG. 5a presents a basic flow chart illustrating the sequencing of the Set Ports In & Out routine of the computer program utilized in this invention.
Figure 5B:
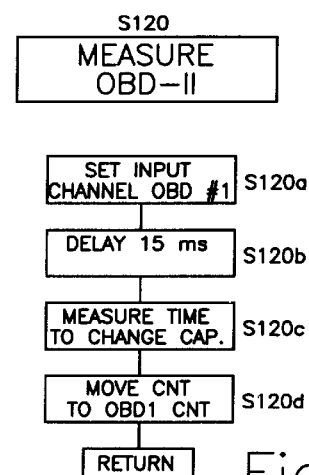
FIG. 5b presents a basic flow chart illustrating the sequencing of the Measure OBDII routine of the computer program utilized in this invention.
Figure 5C:
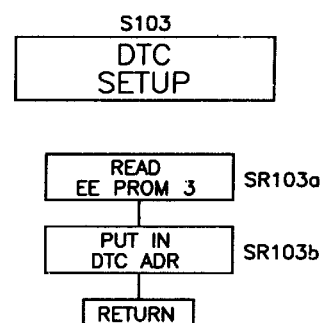
FIG. 5c presents a basic flow chart illustrating the sequencing of the DTC Setup routine of the computer program utilized in this invention.

After the gauge relay has been turned on, the SETUP DTC routine, S103, is called. To set up the Diagnostic Trouble Code, the system looks in an EEPROM when it is first powered up, and selects a specific memory address, in which the latest memory code is stored. The address is saved in a variable so that it may be retrieved for diagnostic purposes. Referring to FIG. 5c, the address of the last DTC is determined and set at SR103a, and stored in a DTC address via SR103b. The top line of the display (MN AX TTL STATUS) is displayed by outputting an instruction to the LCD at S104.

The final step of the INITIALIZE group, S105, establishes OBDII information by calling the OBDII SETUP routine. This program, shown in detail in FIG. 4c, reads, by means of SR105a and SR105c, the EEPROM memory locations for the current OBDII tank and the current OBDII test, and places them in a variable memory via SR105b and SR105d respectively.

Figure 5D:
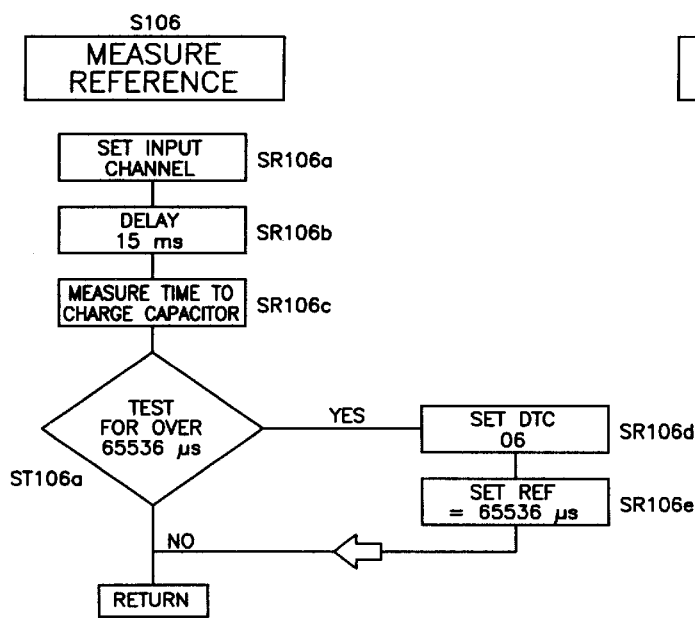
FIG. 5d presents a basic flow chart illustrating the sequencing of the Measure Reference routine of the computer program utilized in this invention.
Figure 6A:
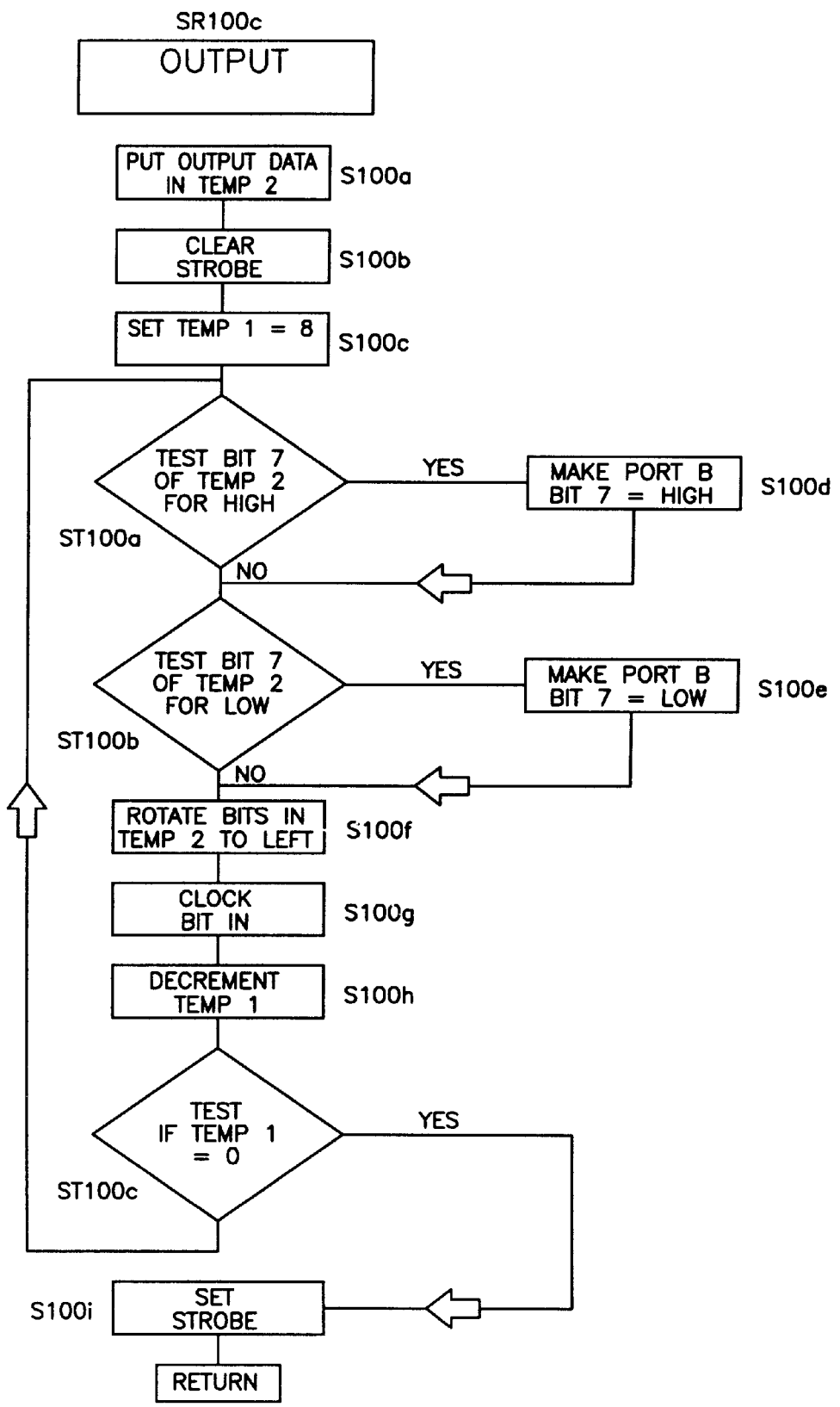
FIG. 6a shows a basic flow chart illustrating the sequencing of the Output routine of the computer program utilized in this invention.

The next S105 sub-routine called is MEASURE REFERENCE, shown at S106 and detailed at FIG. 5d. Here, a voltage reference level is established which is independent of vehicle power supply variations. This is accomplished by first setting the input at SR106a, and delaying the input channel by 15 ms to allow for settling, at SR106b. The time taken to charge a capacitor to a given level is measured at SR106c followed by an ST106a comparison test with 65536 $\mu$sec. This number results from use of an 8-bit microprocessor, set to count up 65536 with two variables REFHICNT and REFLOWCNT. If the time to charge the capacitor is greater than 65536, the DTC 06 trouble code is set at SR106d, and the reference is clamped at 65536 by subroutine SR106e. This trouble code is indicated as a "Reference Problem."

Figure 4C:
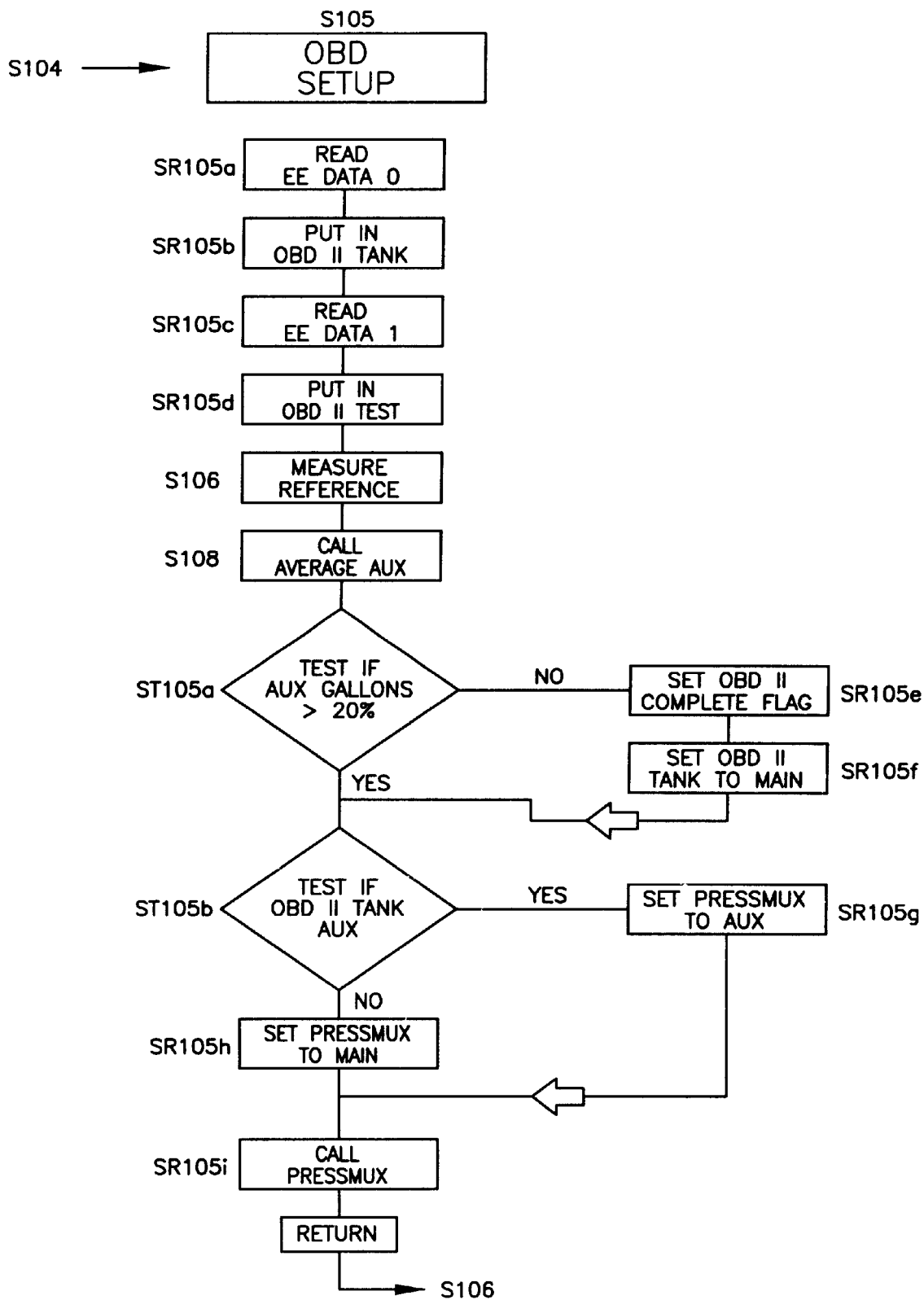
FIG. 4c presents a basic flow chart illustrating the sequencing of the OBDII Setup routine of the computer program utilized in this invention.
Figure 8:
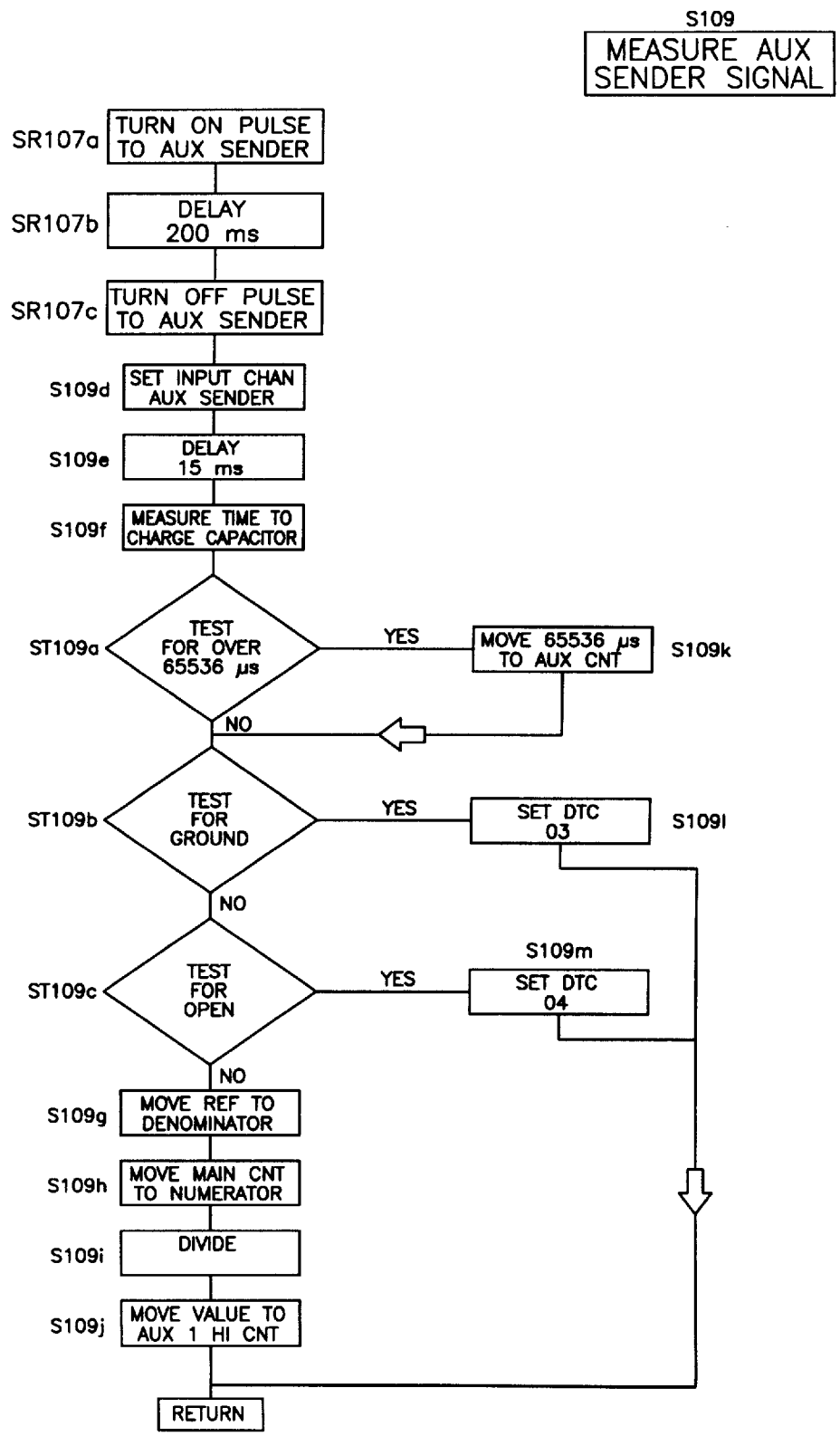
FIG. 8 shows a basic flow chart illustrating the sequencing of the Measure Auxiliary Sender Signal routine of the computer program utilized in this invention.
Figure 8A:
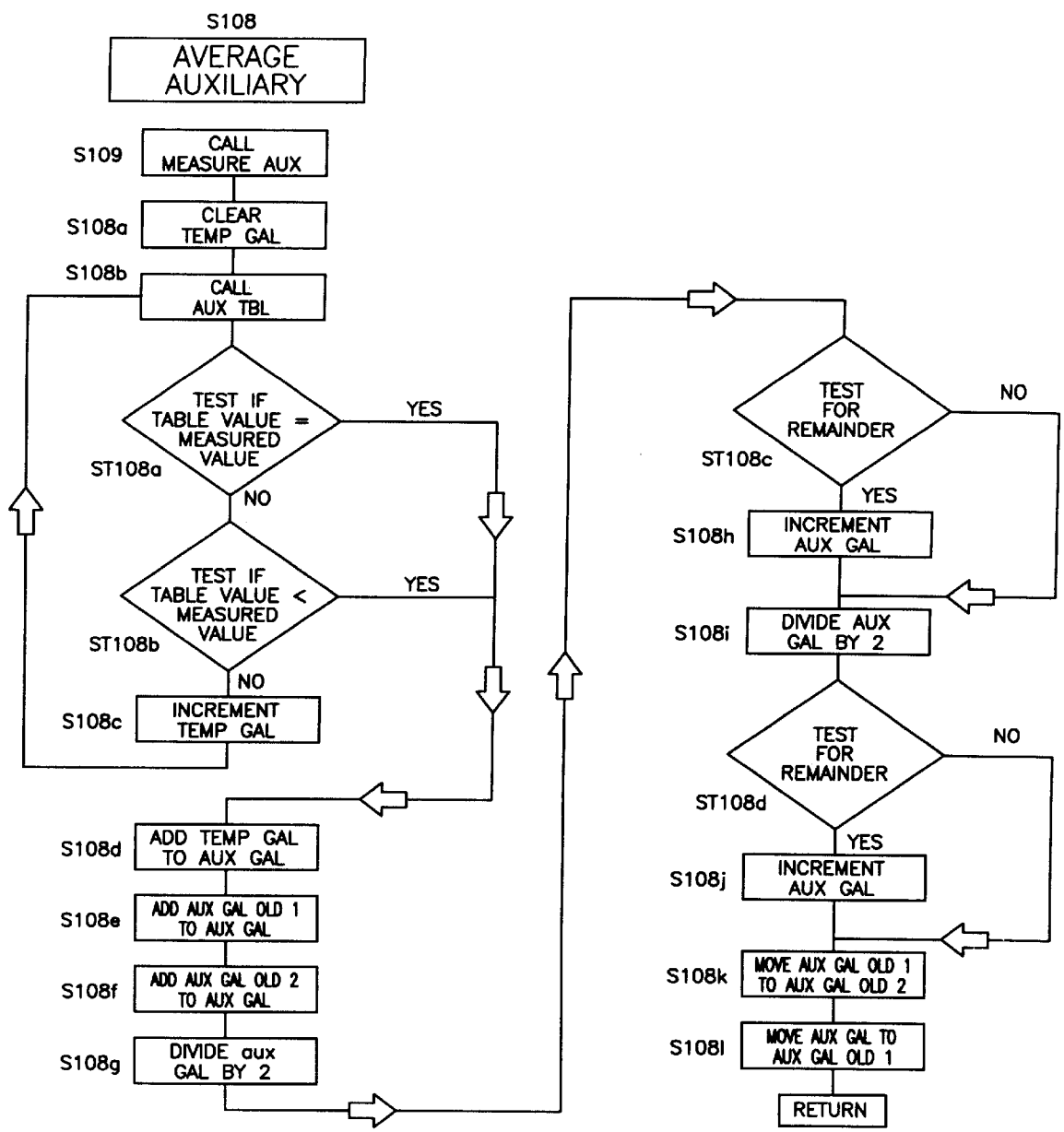
FIG. 8a shows a basic flow chart illustrating the sequencing of the Average Auxiliary routine of the computer program utilized in this invention.

Continuing with the FIG. 4c routine, the system advances to AVERAGE AUXILIARY, which is detailed as S108 in FIG. 8a. This routine then calls the MEASURE AUXILIARY SENDER routine at S109. As previously described, the routine first turns on a transistor to allow a large current pulse to flow through the auxiliary fuel level sender for approximately 200 ms. The pulse is turned off and the multiplexer channel is set to the auxiliary input. After a 15 ms settling time is complete, the routine measures the time it takes to charge up a capacitor to the level of the input. This time is related to voltage at 10,000 $\mu$sec=1 volt. The initial steps, S109a through ST109c, establish a reference level in a manner similar to that performed in S106. If the time is greater than 65536 $\mu$sec at ST109a, the auxiliary counter is set at 65535 $\mu$sec at S109h. This is due to using an 8 bit microprocessor to count to 65535 with two variables AUXHICNT and AUXLOCNT, if the time goes over 65536 then the variables go to zero so instead the variables are set to equal 65536.

Step ST109b and ST109c sequentially test for grounds and opens. If the value of the measured signal at ST109b is below a predetermined amount, then the DTC 03 is set at ST109i, meaning auxiliary sender Ground. Following this test, the open circuit test is performed at ST109c. If the measured signal is above a second pre-determined level, DTC 04 is set, meaning auxiliary sender open at ST109j. If there are not any grounds or opens, Subroutines S109d through S109g perform the following operations:

1) Move REFHICNT to denominator at S109d.
2) Move AUXHICNT and AUXLOWCNT to numerator at S109e.
3) Divide and put the result in AUXHICNT, creating a first Ratio at S109f and S109g which provides independence from reference changes and vehicle voltage changes.

Returning to the AVERAGE AUXILIARY routine, the next step is to clear TEMPGAL at S108a. Then a call is made to the auxiliary table, which returns a value at table TEMPGAL at S108b. Then a test is made to see if the measured value is equal to the table value at ST108a. If the measured value is equal to the table value, then the program jumps to S108d. If the measured value is not equal to the table value, then another test is made to see if the table value is less than the measured value at S108b. If the table value is less than the measured value, then the program jumps to S108d. If the table value is not less than the measured value, then TEMPGAL is incremented at S108c and the program loops back to S108b. When the value from the table position TEMPGAL is equal to or less than the measured value, then TEMPGAL is added to AUXGAL at S108d. Then AUXGALOLD1 is added to AUXGAL at S108e, and AUXGALOLD2 is added to AUXGAL at S108f. Next, AUXGAL is divided by 2 at S108g and a test is made at ST108d to see if there is a remainder; if there is, then AUXGAL is incremented at S108*h*. If there is no remainder or AUXGAL was incremented, then AUXGAL is divided by 2 again at S108*i*. Another test is made to see if there was a remainder at ST108*e*; if there was a remainder, then AUXGAL is incremented at S108*j*. If there was no remainder or AUXGAL was incremented, then AUXGALOLD1 is moved to AUXGALOLD2 at S108*k*, and AUXGAL is moved to AUXGALOLD1 at S108*l*.

Returning to the OBDII SETUP at S105, the prior routines obtained the value of AUXGAL. At ST105*a*, a test is performed to determine that the auxiliary fuel level is above a specified amount, which is considered adequate for running a leak detection test. If this is not the case, an OBDII Complete Flag is set at SR105*e*, and the OBDII tank is set to Main at SR105*f* If the minimum fuel level test is positive, a test at ST105*b* is made to determine if the OBD tank is the auxiliary tank. If this is confirmed, the pressure sensor from the auxiliary tank is connected to the OEM computer through a multiplexer (MUX) at SR105*g*. If the auxiliary fuel is low or the OBD tank is on main, then the pressure sensor from the main tank is connected to the OEM computer.

Main Program Group

After the computer has completed the initialization group, it then starts the MAIN LOOP, as shown in FIG. 4*b*.

The first routine called in the main loop is MEASURE REFERENCE, shown at S106 and described above. This routine measures the voltage on the reference of the input multiplexer, and is used to account for voltage fluctuations on the vehicle. A ratio between the reference voltage and the voltage on the other inputs is generated so as to allow a consistent measurement whether the vehicle voltage increases or decreases.

Figure 7:
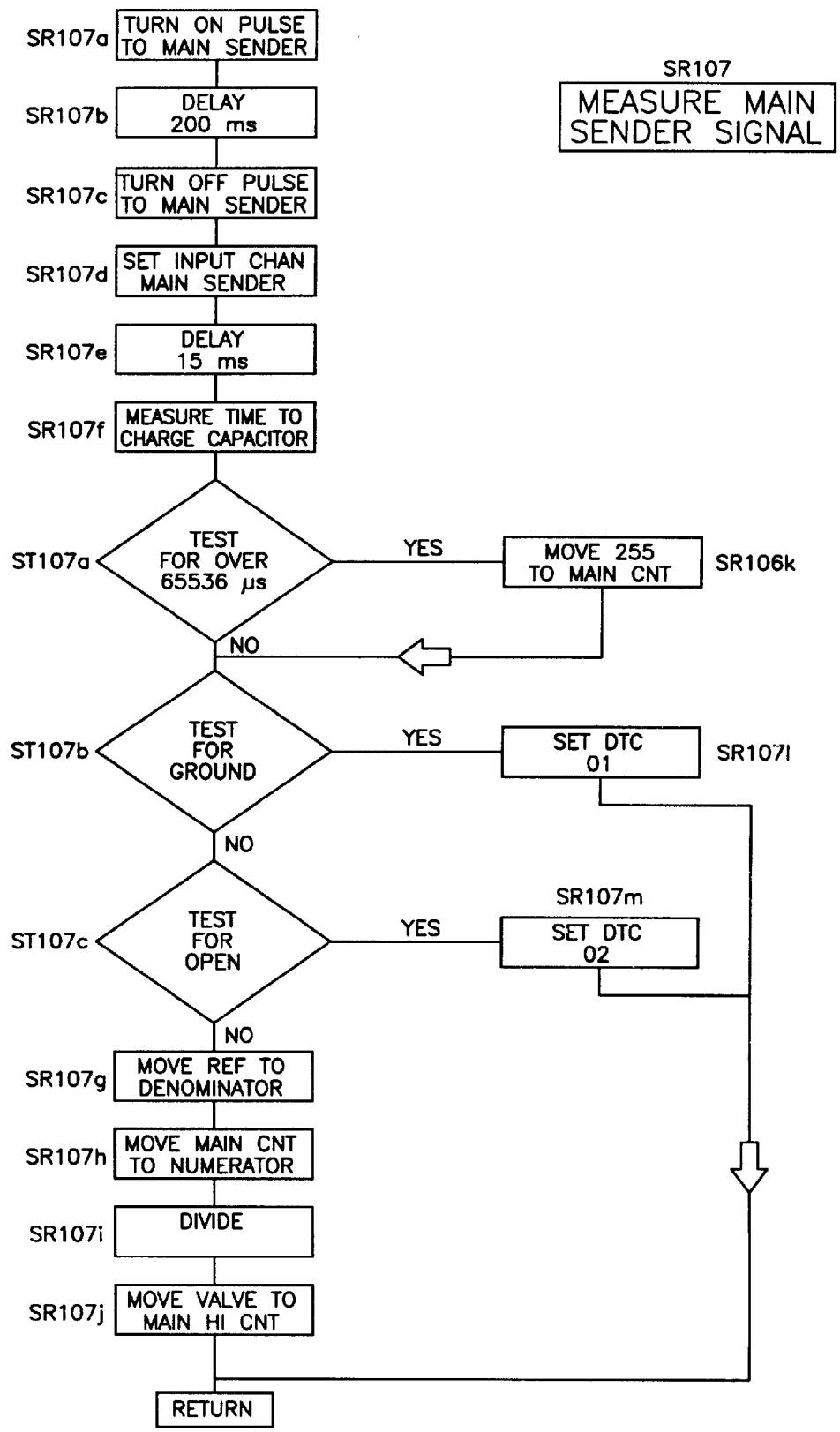
FIG. 7 shows a basic flow chart illustrating the sequencing of the Measure Main Sender Signal routine of the computer program utilized in this invention.
Figure 7A:
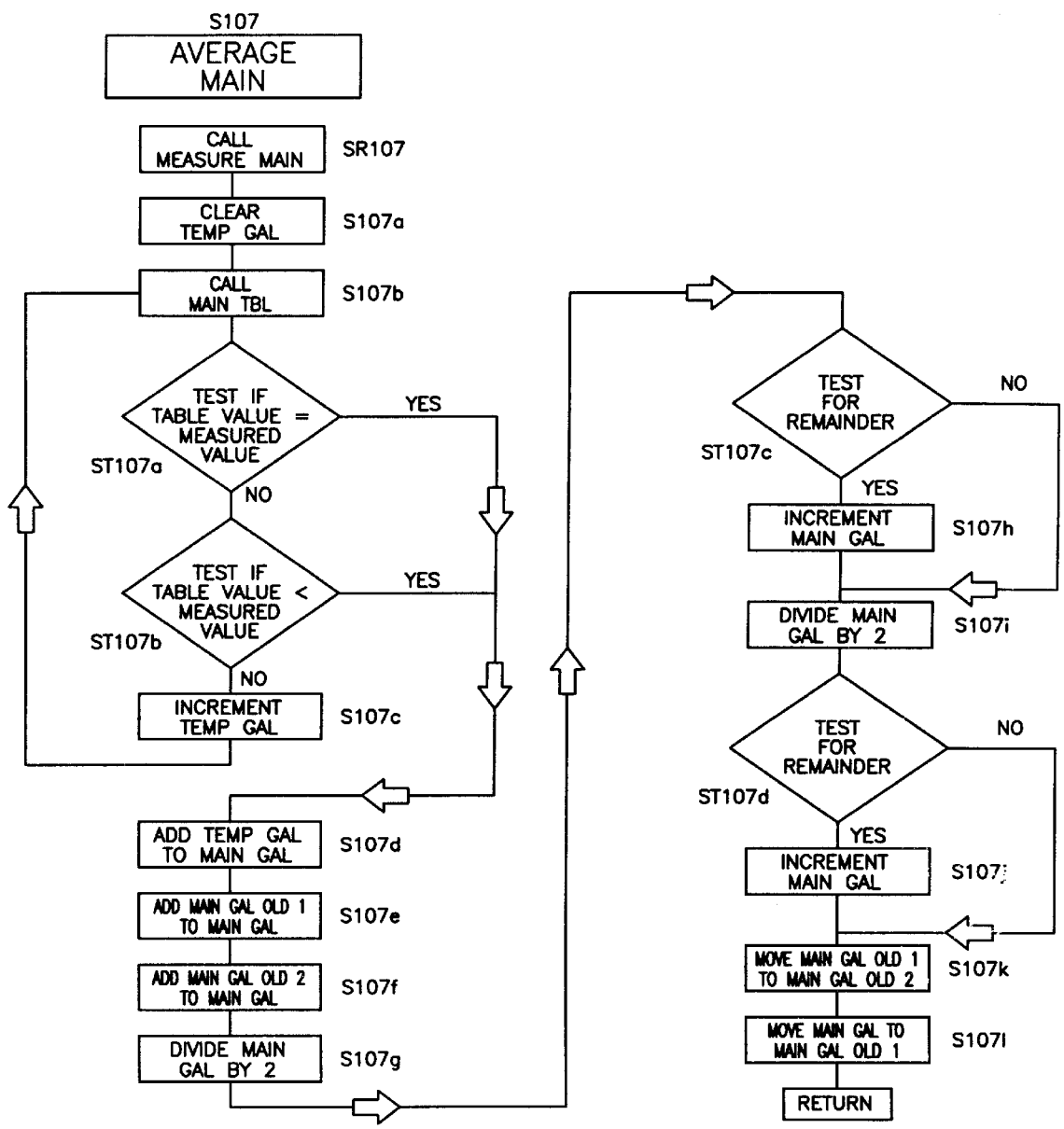
FIG. 7a shows a basic flow chart illustrating the sequencing of the Average Main routine of the computer program utilized in this invention.

The main program then calls the AVERAGE MAIN routine, shown at S107 and detailed in FIG. 7*a*. This routine first calls the MEASURE MAIN subroutine, shown at SR107 and detailed in FIG. 7. This subroutine again turns on a transistor at SR107*a*, to allow a high current pulse to flow through the main fuel level sender. After this pulse is timed for approximately 200 ms at SR107*b*, the pulse is turned off at SR107*c*, and the multiplexor channel is set to the main input at SR107*d*. After a 15 ms settling time at SR107*e* is completed, the routine measures the voltage in the main sender and checks to see if it is within specifications. Step ST107*b* and ST107*c* sequentially test for grounds and opens. If the value of the ground test output in SR 107*b* is below a predetermined amount then the DTC 01 is set, meaning main sender ground. If this test is successful, the test for open circuits is performed at ST 107*c*. If the output is above a pre-determined level, DTC 02 is set, meaning main sender open. If there are not any grounds or opens, Subroutines SR107*d* through SR 107*g* perform the following operations:

(a) Move REFHICNT to denominator.
(b) Move MAINHICNT and MAINLOCNT to numerator.
(c) Divide and put the result in MAINHICNT. This creates a second Ratio which again provides independence from reference changes and vehicle voltage changes.

After the SR107 steps, the Main Count is averaged, then used to convert to gallons by reference to a S107*b* look up-table, in which the relationship between counts and gallons has been stored. After the current level of fuel in the main tank has been determined in gallons, then it is added to the previous three readings and divided by four, similar to the way the auxiliary gallons was averaged and previously described. This averaging helps to reduce the visible signs of fuel sloshing in the tanks.

The main program next calls the AVERAGE AUXILIARY subroutine, shown at S108 and detailed in FIG. 8*a*. This subroutine repeats the program sequences of the AVERAGE MAIN routine, previously given in FIG. 7*a*. After the current level of fuel in the auxiliary tank has been determined in gallons, it is then added to the three previous readings and divided by four.

Figure 13:
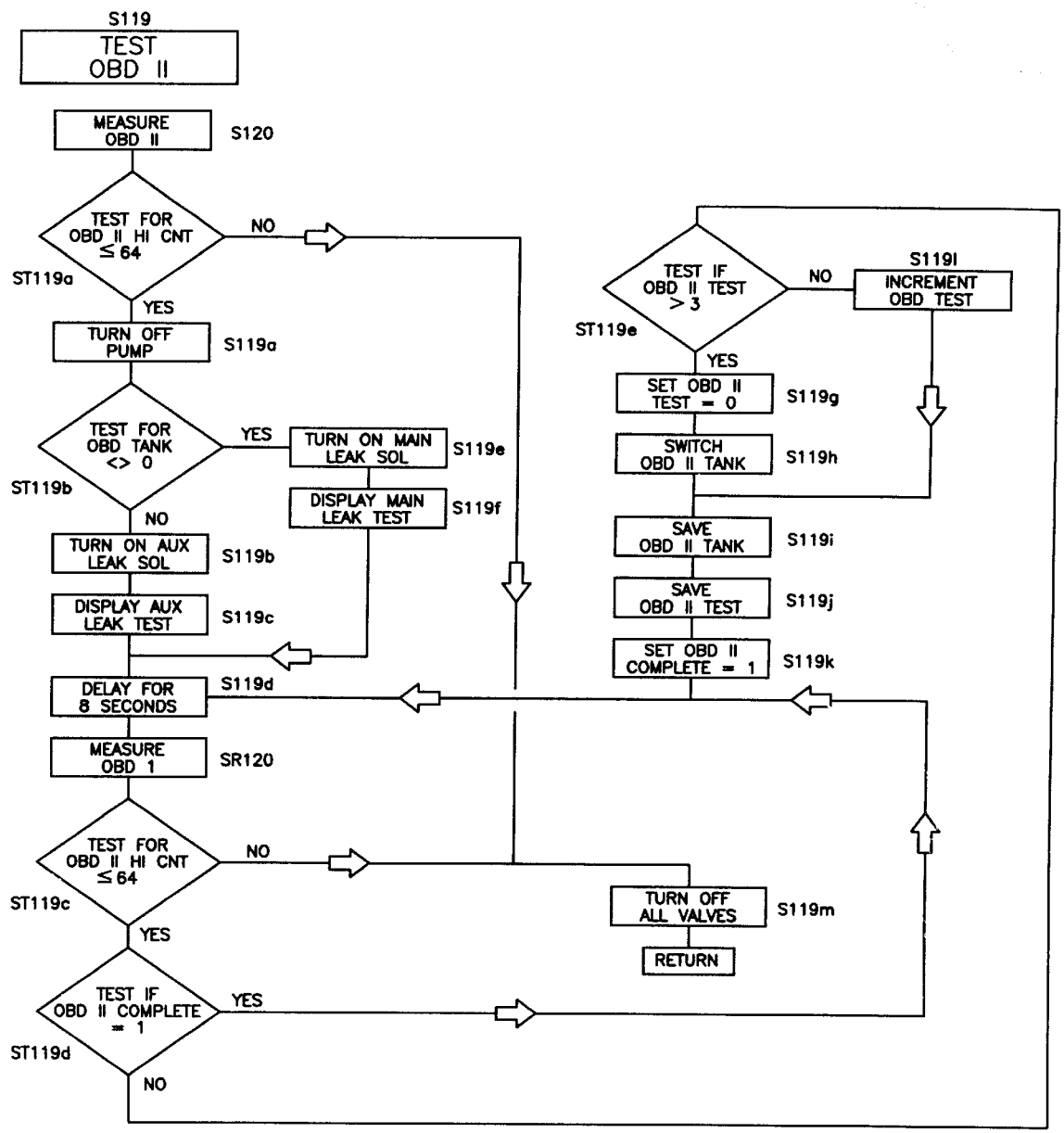
FIG. 13 shows a basic flow chart illustrating the sequencing of the Test OBDII routine of the computer program utilized in this invention.

After the main loop block has completed the measuring and averaging of the main and auxiliary tank's fuel, it then checks to see if an OBDII test is occurring by calling the TEST OBDII routine, shown at S119 and detailed in FIG. 13. This routine first calls the MEASURE OBDII routine S120, which measures the voltage at the OBDII input. This is accomplished by first setting the input at SR120*a*, and delaying the input channel by 15 ms to allow for settling, at SR120*b*. The time taken to charge a capacitor to a given level is measured at SR120*c*. Then the measured count is stored in the variable OBD1CNT for future reference at ST120*d*. At ST119*a*, FIG. 13, a test is made to determine if the OBDIIHI count is below a specified value. If the Count is not less than the specified value, the program jumps to S119*m* where all valves are turned off.

Which leak solenoid valve is closed is determined by the OBDII SETUP routine in the initialize block at S105. If the OBDIIHI count is below the specified value, the leak test is running, and the computer then shuts off the auxiliary fuel pump at S119*a*, FIG. 13, if it was on. This is done by setting the output data to pump off and calling the output routine at SR100. A test is then made to see if the OBDII tank is main ST119*b*. If the OBDII tank is not main, then the computer turns on the main leak solenoid valve ST119*e* and sends an instruction to the LCD to display "ALKT" ST119*f* If the OBDII tank is main, then the computer turns on the auxiliary leak solenoid ST119*b*, and sends an instruction to the LCD to display "MLKT" ST119*c*. After a solenoid valve has been activated, the routine delays for 8 seconds at S119*d*. After the delay, Measure OBDII is called at SR120. The Measure OBD-II subroutine, is detailed at S120 in FIG. 5*b*. The Measure OBDII subroutine is followed by a repeat of the Count Test ST119*a* at ST119*c* to determine if the OEM fresh air vent solenoid is still ON. If the solenoid is still energized, and if the OBDII Test Complete flag at ST119*d* is positive, then the system loops back to another 8-second delay at ST119*d*. If the solenoid is still running, and if an OBDII Test Complete flag at ST119*d* is false, then the program tests to see if the OBDII test is greater than two at ST119*e*. If the test shows that the OBDII test value is greater than two then the OBDII test is set back to 0 at S119*g*, and the OBDII tank is switched at S119*h*. After saving the tank and test data at S119*i* and S119*j*, the OBDII complete=1 is set at S119*k*, and the program again loops back to the 8 second delay at S119*d*.

If the OBDII Test value at ST119*e* is negative, indicating that the system test number is either 0 or 1, the test count is incremented at S119*l*, and the tanks are not switched. After saving the data at ST119*i*, ST119*j*, and setting the OBD complete flag at ST119*k*, the system again returns to the 8-second delay at ST119*d*. If, after any delay the OEM fresh air vent solenoid valve is not energized (the test for OBDII count is less than a specified value), then all valves are turned off at ST119*m* and the routine is exited.

While the OBDII leak test is occurring, the OEM computer is able to monitor the pressure of either the main tank or the auxiliary tank, as determined by the auxiliary computer. The tank that is not under test is then completely sealed so that it does not affect the current test. This process allows both tanks to be tested independently at different times, which conforms to the C.A.R.B. and E.P.A. requirements for OBDII leak detection testing.

Figure 9:
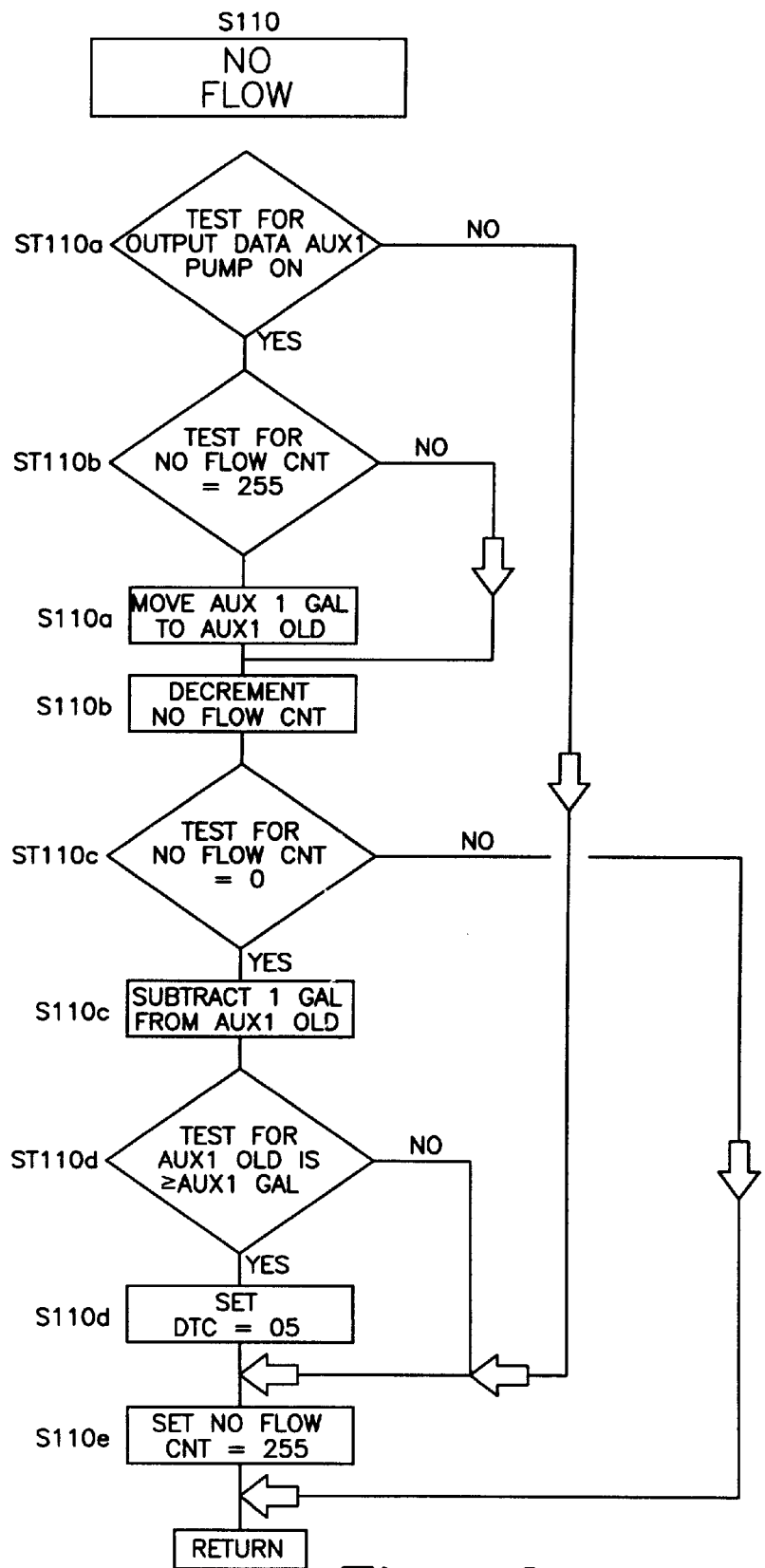
FIG. 9 shows a basic flow chart illustrating the sequencing of the No Flow routine of the computer program utilized in this invention.

If the OBDII test is not running or has been completed, the NO FLOW routine, shown at S110 and detailed in FIG. 9, is next called. This routine tests for a No Flow condition caused by either the transfer pump being inoperative, or by the fuel lines being restricted. When the transfer pump is turned on, the current gallons in the auxiliary fuel tank is stored as a variable. After a specified number of loops through the program, and if the pump is still on, and if it has been continuously running, then the computer compares the current gallons in the auxiliary tank to the previously stored value. If the new value indicates that the fuel in the auxiliary tank did not reduce by more than one gallon in 255 loops, a DTC is set for No Flow.

Referring to FIG. 9, subroutine tests are first made at ST110a to determine that the Auxiliary pump is ON. If the Auxiliary pump is not ON, the NOFLOW count is set to 255 at ST110e and the program exits the routine. If the Auxiliary Pump is ON, the subroutine tests at ST110b to see if the NOFLOW count is equal to 255 loop iterations. If it is, the auxiliary tank gallon value is stored in AUXOLD at S110a, and the NOFLOW count is decremented at S110b. If the NOFLOW count is not equal to 0 at ST110c, the routine is exited. If the NOFLOW count at ST110c is equal to 0,then 1 is subtracted from AUXOLD at ST110c. A test is then made to see if AUXOLD is greater than or equal to AUX-GAL at ST110d. If AUXOLD is greater than or equal to AUXGAL, then DTC 05 is stored at ST110d. If AUXOLD is less than AUXGAL, then the NOFLOW count is reset to 255 at ST110e and the routine is completed.

Figure 10:
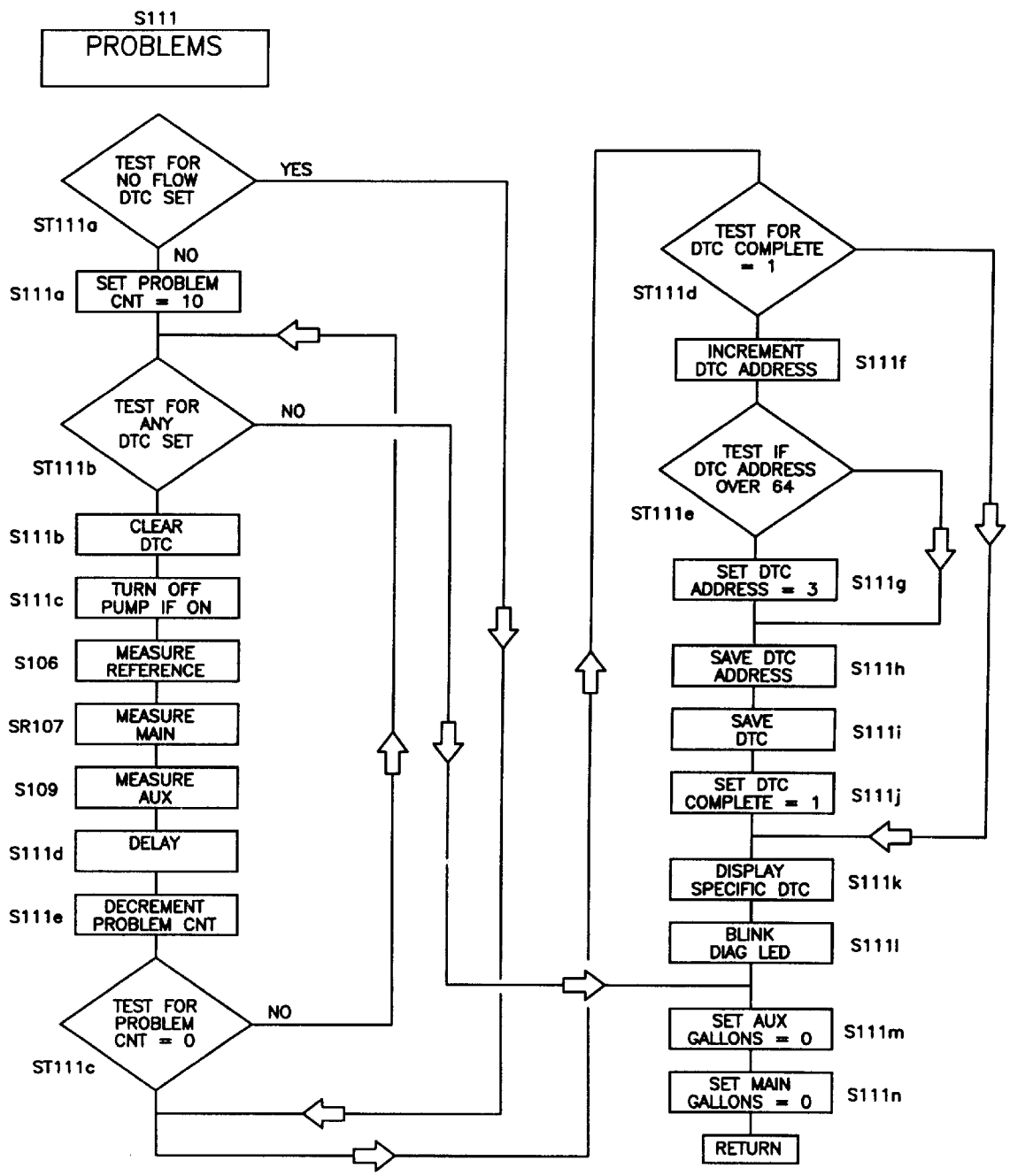
FIG. 10 shows a basic flow chart illustrating the sequencing of the Problems routine of the computer program utilized in this invention.

The next subroutine called in the main loop is the PROBLEMS subroutine, shown at S111 and detailed in FIG. 10. This subroutine tests at ST111a to determine if a No Flow DTC has been set. If it has been set, the program advances to the test for DTC Complete at ST111d.

If it is not a No Flow DTC, the program advances to S111a, Set Problem Count equal to 10. This sets a requirement that 10 problems in a row must occur before further action. The system is then tested at ST111b to determine whether any DTC has been set. If Diagnostic Trouble Codes are not set, the routine is exited. If a DTC has been set, the DTC is cleared at S111b, and the pump is turned off at S111c. This is followed by sequential calls for the S106 MEASURE REFERENCE, the SR107 MEASURE MAIN, and the S109 MEASURE AUXILIARY routines. After a Delay at S111d and a decrement problem count at S111e, the system is tested at ST111c to determine if the problem count equals zero. If it does not, it loops back to ST111b, and a problem is required in all 10 cycles before proceeding. If the system determines that there are not any problems, or that there is a problem that only occurs 2 or 3 loops in a row, then the routine returns to the main loop at ST111c. If any problem occurs for 10 cycles in a row, other than the No Flow problem, the program moves to the test for DTC complete at ST111d. If the program has recently saved a DTC, the routine jumps to the display specific DTC at S111k, which is followed by the blink diagnostic LED at S111l.

If the program does not advance to ST111d, the routine increments the DTC address at S111f, and moves to test if DTC address is over 64, at ST111e. If the address is under 64, it saves the DTC address at S111h. If the DTC address is over 64, it sets the DTC Address=3 at S111g, followed by save DTC at S111h. Then the address of the DTC is saved at ST111i. After both the address and the DTC are saved, the routine proceeds down the flow chart and sets the DTC complete=1 at S111j. This is followed by the display specific DTC at S111k and blink diagnostic led S111l. Then the auxiliary gallons are set to 0 at ST111m, and the main gallons are set to 0a at ST111n. In summary, if a DTC is set for twenty-consecutive measurements of the main and auxiliary senders, then that DTC is displayed on the LCD for a few seconds and the auxiliary and main gallons are set to 0. If it is the first DTC of the current driving cycle, then the DTC is stored in memory. If a DTC is not set during any of the internal loops, then the PROBLEMS Subroutine is completed. If the DTC is a No Flow DTC, then it is stored in memory and displayed on the LCD until the computer is reset.

After the PROBLEMS routine is completed, the gallons in the main and auxiliary tanks and the total gallons are calculated at S112 and displayed on the LCD. The computer then tests to see if the auxiliary pump is on. If the transfer pump is not on, an "OK" is displayed on the LCD.

Figure 11:
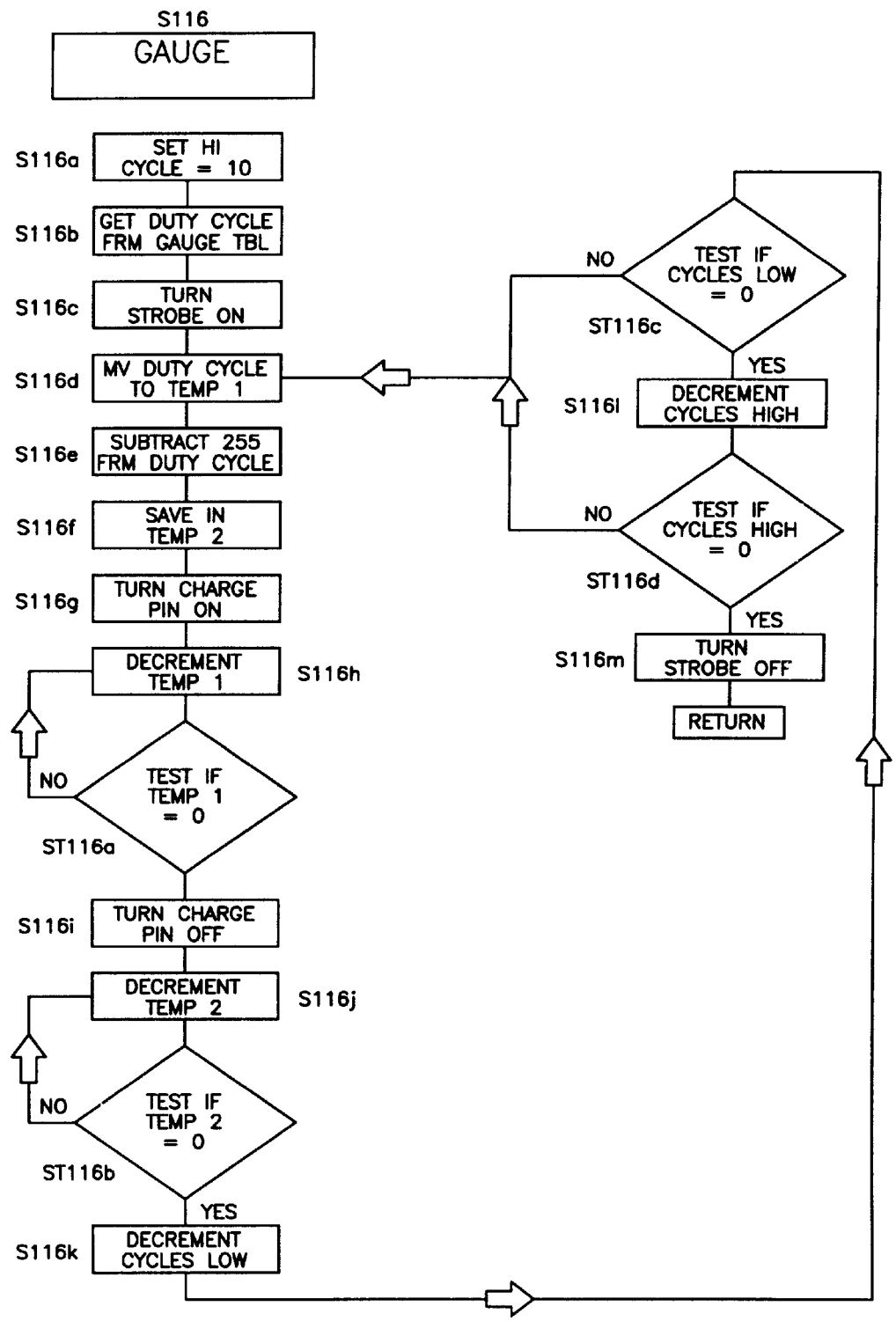
FIG. 11 shows a basic flow chart illustrating the sequencing of the Gauge routine of the computer program utilized in this invention.

Following the display of gallons on the LCD, the GAUGE subroutine, shown at S116 and detailed in FIG. 11, is called. This routine provides means to control the vehicle's fuel gauge so as to provide the operator with an indication of the total fuel on-board. The indication is presented in the normal fashion as a proportion of the sum of both tanks' total capacity. Control over the needle positioning of the existing vehicle fuel gauge is obtained by means of adjusting the current flow through the gauge in most applications and by adjusting the voltage to the gauge in others. A subroutine at S116b takes the total gallons and determines a duty cycle through the use of a look-up table. This duty cycle is then outputted to a current sink through PMW (pulse width modulation) to create an analog output. This analog current sink controls the current or voltage through the fuel gauge so as to cause the gauge needle to move to a desired proportional position.

Referring to FIG. 11. The gauge routine, first the HICYCLE variable is set to 10 at ST116a. Then the gauge table is called, which returns the DUTYCYCLE to set the gauge to the position indicated by the total gallons at ST116b. Then the strobe pin is set at ST116c to allow the PWM circuit to accept input. Then the previously obtained DUTYCYCLE is moved to variable TEMP1 at ST116d. Then the DUTYCYCLE is subtracted from 255 at ST116e and saved in the variable TEMP2 at ST116f Next the charge pin is turned on allowing a capacitor to charge at ST116g. Then TEMP1 is decremented at ST116h and tested to see if it is equal to zero at ST116i. If it is not zero, the program loops back to ST116h and decrements TEMP1 variable. If TEMP1 is equal to zero, then the charge pin is turned off at ST116j. Then TEMP2 is decremented at ST116k, and tested to see if it equals zero at ST116l. If TEMP2 does not equal zero, then the program loops back to ST116k and decrements TEMP2. If TEMP2 is equal to zero, then the CYCLESLOW variable is decremented at ST116p, and a test is made to see if CYCLESLOW is equal to zero at ST116q. If CYCLESLOW is not equal to zero, then the program loops back to ST116d, which continues to turn the charge pin off and on appropriately. If the CYCLESLOW variable is equal to zero, then CYCLESHIGH is decreased by 1 at ST116r, and a test is made to see if CYCLESHIGH is equal to zero at ST116s. If CYCLESHIGH is not equal to zero, then the program loops back to ST116d, which continues to turn the charge pin off and on appropriately. If the CYCLESHIGH variable was equal to zero, then the strobe pin is turned off at ST116t and this causes the PWM circuit to disallow input and to continue to function.

Figure 12:
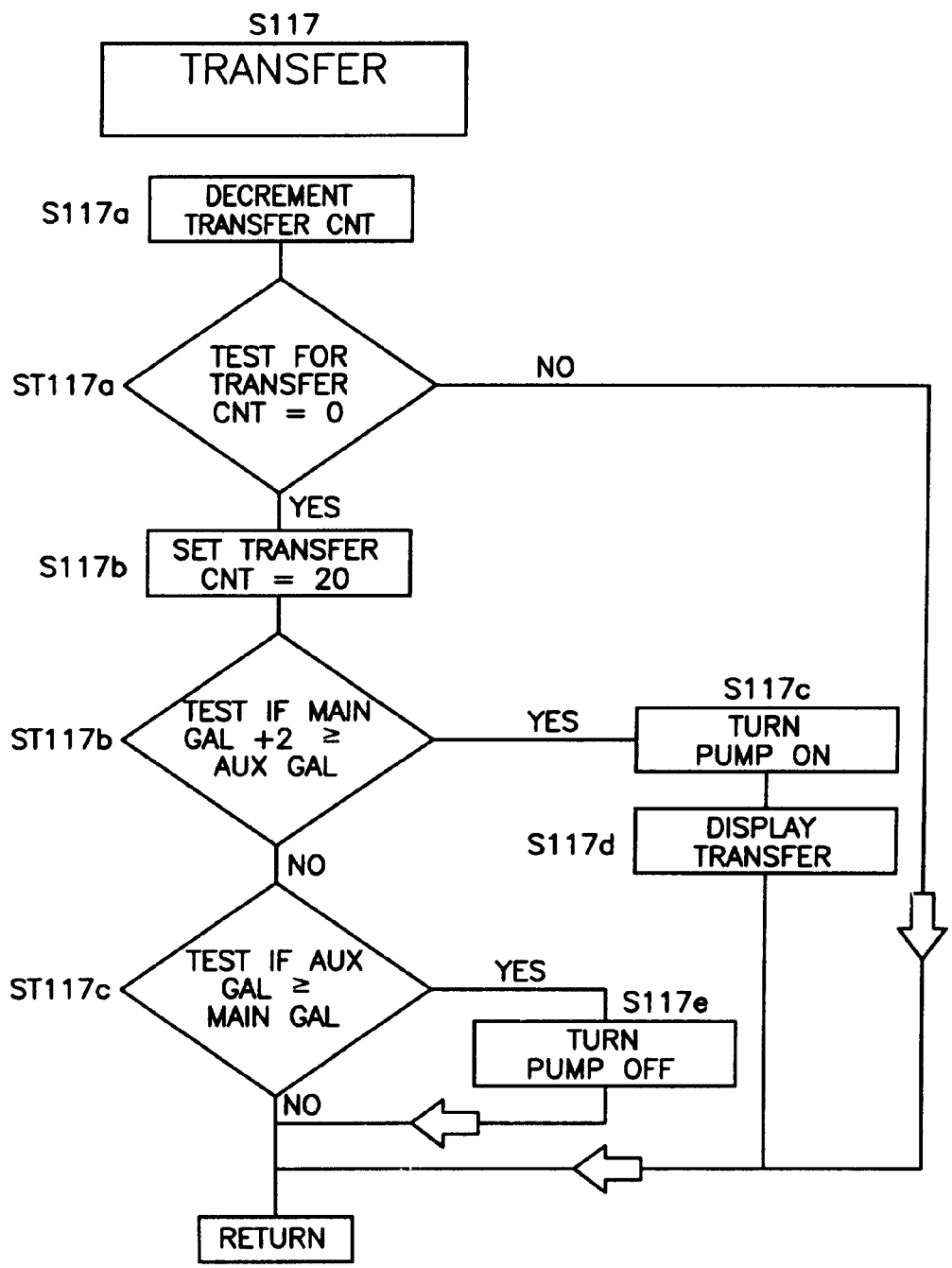
FIG. 12 shows a basic flow chart illustrating the sequencing of the Transfer routine of the computer program utilized in this invention.

After the gauge has been adjusted, the TRANSFER subroutine, shown at S117 and if detailed in FIG. 12 is called. This subroutine determines whether or not to transfer fuel to the main tank. Each time the transfer loop is called, the transfer count variable is decreased. If this variable becomes zero, then the computer determines whether or not it is necessary to transfer fuel. If the auxiliary tank is two gallons greater than the main tank, the transfer pump is turned on. If the main tank is equal to the auxiliary tank gallons, then the transfer pump is turned off. After it has checked for transfer, and has turned the pump on or off, the transfer count variable is reset. This sequence prevents fuel sloshing from causing the pump to continuously turn on and off. The time between checking for transfer is about 32 loops.

Referring to FIG. 12, the transfer routine is initiated with a Decrement Transfer Count at S117a, followed by a Test For Transfer Count, ST117a, to determine if it is equal to "0". Transfer Count is established at the initial set-up and is set at a desired number of loop iterations, in this case 20. If the Transfer Count is tested at ST117a to be equal to "0", this causes the Transfer Count to be re-set to "20", prior to a ST117b Test, if Main Gallons +2 is equal to or less than the Auxiliary Gallons. If so, the pump is turned on at S117d, and the word "PMP ON" is displayed on the LCD via S117e. If the results of the test at ST117b are negative, a test at ST117c is next performed to determine whether the Auxiliary Gallons are equal to the Main Gallons. If so, the pump is turned off at S117f and the loop returns. After the TRANSFER subroutine is completed, the program delays at S118, allowing each loop through the main loop block to take approximately five seconds. After this delay, the main loop continues to run until the vehicle is turned off.

Although the foregoing descriptions are for a vehicle having a single OEM fuel system and a single, similarly-sized Auxiliary fuel system, it will be recognized that the principals taught herein may be adapted to vehicles having pluralities of OEM fuel systems and multiples of differently-sized Auxiliary fuel systems.

The foregoing description and drawings were given for illustrative purposes only; it being understood that the invention is not limited to the embodiments disclosed, but is intended to embrace any and all equivalent alternatives, modifications and rearrangements of hardware or software elements falling within the scope of the invention as defined by the following claims.

I claim:

1. In a fuel supply system for providing fuel to an engine, including a main fuel tank for containing a supply of fuel, a main fill neck for filling said main fuel tank, a main fuel pump for transferring fuel from said main fuel tank to said engine, a main emission control system for control of fuel vapors within said main fuel tank, a sending unit for measuring the amount of fuel within said main fuel tank and for sending data corresponding to said main fuel measurements to main computational and display devices, and one or more auxiliary fuel tanks containing additional supplies of fuel, comprising:

auxiliary fill necks for filling additional fuel in said auxiliary fuel tanks;

auxiliary sending units for measurement of the amount of fuel within said auxiliary fuel tanks, and for sending data corresponding to the measurement of fuel in said auxiliary tanks to auxiliary computational and display devices;

auxiliary fuel pumps for transferring fuel from said auxiliary fuel tanks to said main fuel tank;

an auxiliary emission control system for control of fuel vapors generated within said auxiliary fuel tanks;

pressure sensors for measuring fuel pressure within said auxiliary tanks; and an auxiliary computer for command and control of both auxiliary and main fuel supply systems in accordance with a selected sequencing program, said auxiliary computer having memories for storing both main and auxiliary fuel and test data on a storage medium, processors for processing said data in said memories, and initialization programs for setting the initial conditions for memory and for processing data from all said fuel storage systems.

2. The fuel supply system according to claim 1, wherein said auxiliary computer is programmed to conduct tests of both auxiliary and main fuel supply systems in accordance with selected sequencing programs.

3. The fuel supply system according to claim 2, wherein said auxiliary computer is programmed to conduct onboard diagnosis of both auxiliary and main fuel supply system failures in accordance with a selected sequencing program.

4. The fuel supply system according to claim 3, wherein said auxiliary computer initiates measurement and comparison of the fuel measurement senders' data from both main and auxiliary tanks, and commands said auxiliary pumps to transfer fuel from said auxiliary fuel tanks to said main fuel tanks until the amounts of fuel within each said fuel tanks are approximately balanced.

5. The fuel supply system according to claim 4, further comprising displays for operator visual indications of total fuel system status.

6. The fuel supply system according to claim 5, wherein said auxiliary computer calculates the total fuel available in both said tanks for transmission to the operators main fuel displays.

7. The fuel supply system according to claim 5, wherein said displays includes liquid crystal displays to provide total fuel levels and test status readings for system operators.

8. The fuel supply system according to claim 7, wherein said displays further include light emitting diodes to provide flashing trouble code indications of potential problems.

9. The fuel supply system according to claim 4, wherein said auxiliary computer is programmed to conduct onboard diagnosis of a main tank fuel flow problem by testing for a grounded main fuel sender and monitoring said problem for a set period of time, followed by initiating a unique display trouble code.

10. The fuel supply system according to claim 9, wherein said auxiliary computer is programmed to conduct onboard diagnosis of a main tank fuel flow problem by testing for an open main fuel sender and monitoring said problem for a set period of time, followed by initiating a unique display trouble code.

11. The fuel supply system according to claim 9, wherein said auxiliary computer is programmed to conduct onboard diagnosis of an auxiliary tank fuel flow problem by testing for a grounded auxiliary fuel sender and monitoring said problem for a set period of time, followed by initiating a unique display trouble code.

12. The fuel supply system according to claim 11, wherein said auxiliary computer is programmed to conduct onboard diagnosis of an auxiliary tank fuel flow problem by testing for an open auxiliary fuel sender and monitoring said problem for a set period of time, followed by initiating a unique display trouble code.

13. The fuel supply system according to claim 12, wherein said auxiliary computer is programmed to conduct onboard diagnosis of an auxiliary tank fuel flow problem by testing for the lack of a reduction in the fuel level within said auxiliary tank and monitoring said problem for a set period of time, followed by initiating display of a unique trouble code.

14. The fuel supply system according to claim 13, wherein said fuel display and said main fuel gage means are set to zero when a trouble code light is flashing, whereby additional warning is provided to the operator.

15. The fuel supply system according to claim 4, whereby said for control of fuel vapors generated within said auxiliary fuel tank further comprises auxiliary evaporative canisters for adsorption of emissions from said auxiliary fuel tank means.

16. The fuel supply system according to claim 15, whereby said auxiliary computers are programmed to separately perform leak tests on both main and auxiliary tanks, whereby emissions of fuel vapors generated within each fuel tank may be evaluated.

17. The fuel supply system according to claim 16, wherein said leak tests on said main fuel tank and its emission canisters are performed by connecting said main tank pressure transducer to said auxiliary computer while the auxiliary tank is isolated.

18. The fuel supply system according to claim 17, wherein said auxiliary computers are programmed to sequentially test each tank for three consecutive driving cycles.

19. The fuel supply system according to claim 4, wherein said main computers further comprise separate main computer means specifically programmed for control, test and diagnostics of said main fuel supply system.

20. The fuel supply system according to claim 19, wherein leak tests on said auxiliary tank and its emission canisters are performed by connecting said auxiliary tank pressure transducer to said main computer while the main tank is isolated.

21. The fuel supply system according to claim 20, wherein said auxiliary computer is programmed to replicate the same specific control and test of said main fuel supply system in accordance with said main specific sequencing programs.

22. The fuel supply system according to claim 20 wherein said auxiliary computer is programmed to conduct onboard diagnosis of said main fuel supply system failures in accordance with specific main sequencing programs.

23. The fuel supply system according to claim 22, wherein said auxiliary computer is programmed to conduct onboard diagnosis of both auxiliary and main fuel supply system failures in accordance with requirements of the California Air Resources Board, On Board Diagnostics II.

24. The fuel supply system according to claim 23, wherein said auxiliary computer is programmed to conduct onboard diagnosis of both auxiliary and main fuel supply system failures in accordance with the requirements of the U.S. Environmental Protection Agency On Board Diagnostics II.

25. In a fuel supply system for providing fuel to an engine, said system having a main fuel tank for containing a supply of fuel, a main fill neck for filling said main fuel tank, a main fuel pump for transferring fuel from said main fuel tank to said engine, a main emission control system for control of fuel vapors within said main fuel tank, a sending unit for measuring the amount of fuel within said main fuel tank and for sending data corresponding to said main fuel measurements to main computational and display devices, a method of increasing the total fuel supply comprising the steps of:
providing an auxiliary fuel supply system having fill necks for filling and storing additional fuel in auxiliary fuel tanks;
connecting said auxiliary fuel tanks to said main fuel tank for fuel transportation thereto;
commanding, and controlling both auxiliary and main fuel supply systems by an auxiliary computer in accordance with a selected sequencing program, said auxiliary computer having memories for storing data on a storage medium, processors for processing said data, and an initialization program for setting the initial conditions for both said processors and said memories;
measuring the amount of fuel within each said fuel tank;
sending signals corresponding to the measurement of fuel in each said fuel tank to said auxiliary computers for determination of the difference in the amount of fuel in each tank; and
transporting fuel from said auxiliary fuel tanks to said main fuel tank to minimize said difference.

26. The method of claim 25 wherein said auxiliary computer is programmed to conduct tests of both auxiliary and main fuel supply systems in accordance with a selected sequencing program.

27. The method of claim 26, wherein said auxiliary computer is programmed to conduct onboard diagnosis of both auxiliary and main fuel supply system failures in accordance with a selected sequencing program.

28. The method of claim 27, further comprising connecting displays for visual indications of system status.

29. The method of claim 28, wherein said displays include liquid crystal displays to provide fuel levels and status readings for system operators.

30. The method of claim 29, wherein said displays further include light emitting diode means to provide flashing trouble code indications of potential problems.

31. The method of claim 30, wherein said auxiliary computers are programmed to conduct onboard diagnosis of a main tank fuel flow problem by testing for a grounded main fuel sender means and monitoring said problem for a set period of time, followed by initiating the display of a unique flashing trouble code.

32. The method of claim 31, wherein said auxiliary computers are programmed to conduct onboard diagnosis of a main tank fuel flow problem by testing for an open main fuel sender means and monitoring said problem for a set period of time, followed by initiating a unique flashing display trouble code.

33. The method of claim 27, wherein said auxiliary computers are programmed to conduct onboard diagnosis of an auxiliary tank fuel flow problem by testing for a grounded auxiliary fuel sender and monitoring said problem for a set period of time, followed by initiating a unique flashing display trouble code.

34. The method of claim 33, wherein said auxiliary computers are programmed to conduct onboard diagnosis of an auxiliary tank fuel flow problem by testing for an open auxiliary fuel sender means and monitoring said problem for a set period of time, followed by initiating a unique flashing display trouble code.

35. The method of claim 30, wherein said auxiliary computers are programmed to conduct onboard diagnosis of an auxiliary tank fuel flow problem by testing for the lack of a drop in the in the fuel level within said auxiliary tank and monitoring said problem for a set period of time, followed by initiating a display of a unique flashing trouble code.

36. The method of claim 35, wherein said fuel displays and said main fuel gages are set to zero when a trouble code light is flashing, whereby additional warning is provided to the operator.

37. The method of claim 36, whereby said auxiliary fuel supply system further comprises testing the auxiliary evaporative canisters for adsorption of emissions from said auxiliary fuel tank means.

38. The method of claim 37, whereby both said computers are programmed to separately perform leak tests on both main and auxiliary evaporative canisters whereby emissions of fuel vapors generated within each fuel tank may be evaluated.

39. The method of claim 38, wherein said leak tests on said auxiliary tank and its emission canisters are performed by connecting said auxiliary tank pressure transducer to said main computer while the main tank is isolated.

40. The method of claim 39, wherein said leak tests on said main fuel tank and its emission canisters are performed by connecting said main tank pressure transducer to said main computer while the auxiliary tank is isolated.

41. The method of claim 40, wherein said auxiliary computers are programmed to sequentially test each tank for three consecutive driving cycles.

42. The method of claim 41, further comprising the step of providing main computer for control of said auxiliary fuel supply system.

43. The method of claim 42, wherein said main computer is programmed to conduct tests of said auxiliary fuel supply system in accordance with a selected sequencing program.

44. The method of claim 43, wherein said leak tests on said auxiliary tank and its emission canisters are performed by connecting said auxiliary tank pressure transducer to said main computer while the main tank is isolated.

45. The method of claim 44, wherein said auxiliary computers are programmed to conduct onboard diagnosis of both auxiliary and main fuel tanks.

46. The method of claim 45, wherein said auxiliary computers are programmed to conduct on-board diagnosis of both auxiliary and main fuel tanks in accordance with requirements of the California Air Resources Board, On Board Diagnostics II.

47. The method of claim 46, wherein said auxiliary computers are programmed to conduct onboard diagnosis of both auxiliary and main fuel supply system failures in accordance with the requirements of the U.S. Environmental Protection Agency On Board Diagnostics II.

48. The fuel supply system according to claim 4, wherein each said auxiliary computer initiates a method of reducing sender contact corrosion prior to measurement of the fuel sending data from both main and auxiliary fuel tanks.

49. The fuel supply system according to claim 48, wherein said method of reducing sender contact corrosion comprises application of a current pulse prior to said measurements.

50. The fuel supply system according to claim 49, wherein said application of said current pulse comprises maintenance of said pulse for 200 ms within 20 ms of said sender measurements.

51. The method of claim 26 further comprising the step of reducing the effect of contact corrosion by application of a current pulse prior to each measurement of the fuel sending data from both main and auxiliary fuel tanks.

52. The method of claim 51, wherein the application of said current pulse is of 200 ms duration within 20 ms prior to each sender measurement.

* * * * *